(12) United States Patent
Jones et al.

(10) Patent No.: US 10,970,935 B2
(45) Date of Patent: Apr. 6, 2021

(54) BODY POSE MESSAGE SYSTEM

(71) Applicant: Curious Company, LLC, Portland, OR (US)

(72) Inventors: Anthony Mark Jones, Hillsboro, OR (US); Jessica A. F. Jones, Forest Grove, OR (US); Bruce A. Young, Le Mars, IA (US)

(*) Notice: Subject to any disclaimer, the term of this patent is extended or adjusted under 35 U.S.C. 154(b) by 0 days.

(21) Appl. No.: 16/230,278

(22) Filed: Dec. 21, 2018

(65) Prior Publication Data

US 2020/0202625 A1 Jun. 25, 2020

(51) Int. Cl.
*G06T 15/00* (2011.01)
*G06T 19/00* (2011.01)
*G06F 3/01* (2006.01)

(52) U.S. Cl.
CPC ............ *G06T 19/006* (2013.01); *G06F 3/011* (2013.01); *G06F 3/017* (2013.01); *G06T 2200/04* (2013.01); *G06T 2200/24* (2013.01)

(58) Field of Classification Search
CPC ......... G01B 7/003; G06T 7/70; G01S 5/0263; G01S 11/12; G01S 5/0247; G01S 11/02; G06F 1/1694; G06F 1/1698; G06F 3/011; G06F 11/14; G06F 17/08; G06K 9/2027; A61B 2034/2063; A61B 2034/2051; A61B 2034/2055; H04B 5/0056
USPC ........................................................ 345/418
See application file for complete search history.

(56) References Cited

U.S. PATENT DOCUMENTS

| | | | |
|---|---|---|---|
| 3,861,350 A | 1/1975 | Selleck | |
| 5,309,169 A | 5/1994 | Lippert | |
| 5,815,411 A | 9/1998 | Ellenby et al. | |
| 8,520,900 B2* | 8/2013 | Rhoads | G06Q 30/06 382/107 |
| 8,863,039 B2 | 10/2014 | Lim et al. | |
| 8,953,841 B1 | 2/2015 | Leblang et al. | |

(Continued)

FOREIGN PATENT DOCUMENTS

| | | |
|---|---|---|
| CN | 103697900 A | 4/2014 |
| CN | 105781618 A | 7/2016 |

(Continued)

OTHER PUBLICATIONS

Le Chénéchal M, Duval T, Gouranton V, Royan J, Arnaldi B. Vishnu: virtual immersive support for HelpiNg users an interaction paradigm for collaborative remote guiding in mixed reality. In2016 IEEE Third VR International Workshop on Collaborative Virtual Environments (3DCVE) Mar. 20, 2016 (pp. 9-12). IEEE.*

(Continued)

*Primary Examiner* — Phu K Nguyen
(74) *Attorney, Agent, or Firm* — Young's Patent Services, LLC; Bruce A Young

(57) ABSTRACT

A person who is not using a hybrid reality (HR) system communicates with the HR system without using a network communications link using a body pose. Data is received from a sensor and an individual is detected in the sensor data. A first situation of at least one body part of the individual in 3D space is ascertained at a first time and a body pose is determined based on the first situation of the at least one body part. An action is decided on based on the body pose and the action is performed on an HR system worn by a user.

20 Claims, 8 Drawing Sheets

(56) References Cited

U.S. PATENT DOCUMENTS

| | | | |
|---|---|---|---|
| 9,165,381 B2* | 10/2015 | Latta | G06T 11/00 |
| 9,229,231 B2* | 1/2016 | Small | G06F 3/013 |
| 9,292,096 B2* | 3/2016 | Watanabe | G06F 3/017 |
| 9,852,599 B1 | 12/2017 | Slavin et al. | |
| 9,911,020 B1 | 3/2018 | Liu et al. | |
| 9,928,662 B2* | 3/2018 | Palmaro | G06T 19/20 |
| 9,953,216 B2* | 4/2018 | Alvarez | G06K 9/2081 |
| 9,978,180 B2* | 5/2018 | Margolis | H04N 19/139 |
| 10,065,074 B1 | 9/2018 | Hoang et al. | |
| 10,134,192 B2* | 11/2018 | Tomlin | G06T 19/006 |
| 10,203,762 B2* | 2/2019 | Bradski | H04N 13/366 |
| 10,430,985 B2* | 10/2019 | Harrises | G02B 27/0172 |
| 10,497,161 B1 | 12/2019 | Jones et al. | |
| 10,528,228 B2* | 1/2020 | Seixeiro | G06F 3/167 |
| 10,636,197 B2 | 4/2020 | Jones | |
| 10,636,216 B2 | 4/2020 | Jones et al. | |
| 10,650,600 B2 | 5/2020 | Jones et al. | |
| 10,706,629 B2* | 7/2020 | Boyapalle | G06F 3/013 |
| 10,803,668 B2 | 10/2020 | Jones et al. | |
| 10,818,088 B2 | 10/2020 | Jones et al. | |
| 10,861,239 B2 | 12/2020 | Jones et al. | |
| 10,872,584 B2 | 12/2020 | Jones et al. | |
| 10,901,218 B2 | 1/2021 | Jones et al. | |
| 2002/0191004 A1 | 12/2002 | Ebersole | |
| 2002/0196202 A1 | 12/2002 | Bastian et al. | |
| 2003/0025714 A1 | 2/2003 | Ebersole et al. | |
| 2003/0210812 A1 | 11/2003 | Khamene et al. | |
| 2005/0041424 A1 | 2/2005 | Ducharme | |
| 2007/0045641 A1 | 3/2007 | Chua et al. | |
| 2008/0267490 A1 | 10/2008 | Gorges et al. | |
| 2008/0300854 A1 | 12/2008 | Eibye | |
| 2009/0065715 A1 | 3/2009 | Wainright | |
| 2009/0091237 A1 | 4/2009 | Hirosaki et al. | |
| 2009/0109244 A1 | 4/2009 | Conner et al. | |
| 2009/0240431 A1 | 9/2009 | Chau et al. | |
| 2009/0251537 A1 | 10/2009 | Keidar et al. | |
| 2010/0117828 A1 | 5/2010 | Goldman et al. | |
| 2010/0302015 A1 | 12/2010 | Kipman et al. | |
| 2011/0270135 A1 | 11/2011 | Dooley et al. | |
| 2012/0087104 A1 | 4/2012 | Dai et al. | |
| 2012/0105473 A1 | 5/2012 | Bar-Zeev et al. | |
| 2012/0206452 A1 | 8/2012 | Geisner et al. | |
| 2012/0249741 A1 | 10/2012 | Maciocci et al. | |
| 2012/0289290 A1 | 11/2012 | Chae et al. | |
| 2013/0073637 A1 | 3/2013 | Kim | |
| 2013/0222371 A1 | 8/2013 | Reitan | |
| 2013/0249947 A1 | 9/2013 | Reitan | |
| 2013/0249948 A1 | 9/2013 | Reitan | |
| 2013/0342564 A1 | 12/2013 | Kinnebrew et al. | |
| 2014/0002444 A1 | 1/2014 | Bennett et al. | |
| 2014/0184496 A1 | 7/2014 | Gribetz et al. | |
| 2014/0306891 A1 | 10/2014 | Latta et al. | |
| 2015/0109193 A1 | 4/2015 | Sly et al. | |
| 2015/0130790 A1 | 5/2015 | Vasquez et al. | |
| 2015/0243079 A1 | 8/2015 | Cho et al. | |
| 2015/0263806 A1 | 9/2015 | Puscasu et al. | |
| 2015/0278604 A1 | 10/2015 | Shuster et al. | |
| 2015/0293592 A1 | 10/2015 | Cheong et al. | |
| 2015/0325047 A1 | 11/2015 | Conner et al. | |
| 2016/0003737 A1 | 1/2016 | Shimada | |
| 2016/0026219 A1 | 1/2016 | Kim et al. | |
| 2016/0026253 A1 | 1/2016 | Bradski et al. | |
| 2016/0029143 A1 | 1/2016 | Johnson et al. | |
| 2016/0147408 A1 | 5/2016 | Bevis et al. | |
| 2016/0187974 A1 | 6/2016 | Mallinson | |
| 2016/0248506 A1 | 8/2016 | Ryan et al. | |
| 2016/0270656 A1 | 9/2016 | Samec et al. | |
| 2016/0342388 A1 | 11/2016 | Imamura et al. | |
| 2017/0005826 A1 | 1/2017 | Youn | |
| 2017/0026560 A1 | 1/2017 | Whitehouse et al. | |
| 2017/0061696 A1 | 3/2017 | Li et al. | |
| 2017/0091998 A1 | 3/2017 | Piccolo | |
| 2017/0103440 A1 | 4/2017 | Xing et al. | |
| 2017/0117823 A1 | 4/2017 | Arnaud et al. | |
| 2017/0169170 A1 | 6/2017 | Otin | |
| 2017/0173457 A1 | 6/2017 | Rihn | |
| 2017/0192091 A1 | 7/2017 | Felix | |
| 2017/0193705 A1 | 7/2017 | Mullins et al. | |
| 2017/0269712 A1 | 9/2017 | Forsblom et al. | |
| 2017/0277166 A1 | 9/2017 | Popa-Simil et al. | |
| 2017/0277257 A1 | 9/2017 | Ota et al. | |
| 2017/0301107 A1 | 10/2017 | Sasaki | |
| 2017/0323483 A1 | 11/2017 | Palmaro | |
| 2017/0330042 A1 | 11/2017 | Vaziri | |
| 2017/0330376 A1 | 11/2017 | Haseltine et al. | |
| 2017/0341576 A1 | 11/2017 | Lei et al. | |
| 2017/0354878 A1 | 12/2017 | Posin | |
| 2017/0374486 A1 | 12/2017 | Killham et al. | |
| 2018/0011676 A1 | 1/2018 | Han et al. | |
| 2018/0020312 A1 | 1/2018 | Visser et al. | |
| 2018/0029641 A1 | 2/2018 | Solar et al. | |
| 2018/0050267 A1 | 2/2018 | Jones | |
| 2018/0053394 A1 | 2/2018 | Gersten | |
| 2018/0074599 A1 | 3/2018 | Garcia et al. | |
| 2018/0107277 A1 | 4/2018 | Keller et al. | |
| 2018/0120936 A1 | 5/2018 | Keller et al. | |
| 2018/0239144 A1 | 8/2018 | Woods et al. | |
| 2018/0239417 A1 | 8/2018 | Fu et al. | |
| 2018/0246698 A1 | 8/2018 | Huang | |
| 2018/0261012 A1 | 9/2018 | Mullins et al. | |
| 2018/0262270 A1 | 9/2018 | Maricic et al. | |
| 2018/0299272 A1 | 10/2018 | Salowitz | |
| 2018/0299543 A1 | 10/2018 | Lomnitz et al. | |
| 2018/0303190 A1 | 10/2018 | Calilung et al. | |
| 2018/0307310 A1 | 10/2018 | Mccombe et al. | |
| 2018/0350221 A1 | 12/2018 | Chabra et al. | |
| 2019/0007548 A1 | 1/2019 | Sit et al. | |
| 2019/0011703 A1* | 1/2019 | Robaina | A61B 90/36 |
| 2019/0026592 A1 | 1/2019 | Wang et al. | |
| 2019/0101978 A1 | 4/2019 | Iseringhausen et al. | |
| 2019/0113207 A1 | 4/2019 | Palmer et al. | |
| 2019/0114921 A1 | 4/2019 | Cazzoli | |
| 2019/0116448 A1 | 4/2019 | Schmidt et al. | |
| 2019/0132815 A1 | 5/2019 | Zampini et al. | |
| 2019/0196578 A1* | 6/2019 | Iodice | G10K 11/346 |
| 2019/0199136 A1 | 6/2019 | Choi et al. | |
| 2019/0224572 A1 | 7/2019 | Leeper et al. | |
| 2019/0271755 A1 | 9/2019 | Peitz et al. | |
| 2019/0373395 A1 | 12/2019 | Sarkar | |
| 2019/0377538 A1 | 12/2019 | Jones et al. | |
| 2019/0385370 A1* | 12/2019 | Boyapalle | G06T 15/20 |
| 2020/0020145 A1 | 1/2020 | Jones et al. | |
| 2020/0020161 A1 | 1/2020 | Jones et al. | |
| 2020/0020162 A1 | 1/2020 | Jones et al. | |
| 2020/0082600 A1 | 3/2020 | Jones et al. | |
| 2020/0082601 A1 | 3/2020 | Jones et al. | |
| 2020/0082602 A1 | 3/2020 | Jones | |
| 2020/0082628 A1 | 3/2020 | Jones et al. | |
| 2020/0150751 A1 | 5/2020 | Laaksonen et al. | |
| 2020/0183171 A1* | 6/2020 | Robaina | G06F 3/011 |
| 2020/0183631 A1* | 6/2020 | Boyapalle | G06F 3/147 |
| 2020/0292817 A1 | 9/2020 | Jones et al. | |
| 2020/0294314 A1 | 9/2020 | Jones et al. | |
| 2020/0294472 A1 | 9/2020 | Jones et al. | |

FOREIGN PATENT DOCUMENTS

| | | |
|---|---|---|
| CN | 107657662 A | 2/2018 |
| WO | 2003060830 A1 | 7/2003 |
| WO | 2017151778 A1 | 9/2017 |

OTHER PUBLICATIONS

Fink, AR Gesture Control Arrives, Consumer Tech, Sep. 8, 2017, pp. 1-5.*

Kim H, Lee S, Lee D, Choi S, Ju J, Myung H. Real-time human pose estimation and gesture recognition from depth images using superpixels and SVM classifier. Sensors. Jun. 2015;15(6):12410-27.*

Kolkmeier J, Harmsen E, Giesselink S, Reidsma D, Theune M, Heylen D. With a little help from a holographic friend: the OpenIMPRESS mixed reality telepresence toolkit for remote collaboration systems. InProceedings of the 24th ACM Symposium on Virtual Reality Software and Technology Nov. 28, 2018 (pp. 1-11).*

(56) References Cited

OTHER PUBLICATIONS

Piumsomboon T, Day A, Ens B, Lee Y, Lee G, Billinghurst M. Exploring enhancements for remote mixed reality collaboration. InSIGGRAPH Asia 2017 Mobile Graphics & Interactive Applications Nov. 27, 2017 (pp. 1-5).*
Pandey R, White M, Pidlypenskyi P, Wang X, Kaeser-Chen C. Real-time Egocentric Gesture Recognition on Mobile Head Mounted Displays. arXiv preprint arXiv:1712.04961. Dec. 13, 2017.*
MIT News, Guiding robot planes with hand gestures, Mar. 14, 2012, https://www.youtube.com/watch?v=VjVmLA8_uHY&feature=emb_logo.*
Elliott LR, Hill SG, Barnes M. Gesture-based controls for robots: overview and implications for use by Soldiers. US Army Research Laboratory Aberdeen Proving Ground United States; Jul. 1, 2016.*
Polap, Dawid, et al., Obstacle Detection as a Safety Alert in Augmented Reality Models by the Use of Deep Learning Techniques, Sensors (Basil), Dec. 4, 2017.
USPTO, Final Office Action in related case U.S. Appl. No. 16/135,175, dated Jan. 27, 2019.
USPTO, Final Office Action in Related Matter U.S. Appl. No. 16/135,198, dated Jan. 29, 2020.
USPTO, Final Office Action in Related Matter U.S. Appl. No. 16/123,543, dated Jan. 16, 2020.
USPTO, Final Office Action in Related Matter U.S. Appl. No. 16/135,119, dated Jan. 24, 2020.
USPTO, Non-Final Office Action in Related Matter U.S. Appl. No. 16/135,175, dated Oct. 23, 2019.
USPTO, Non-Final Office Action in Related Matter U.S. Appl. No. 16/135,198, dated Nov. 20, 2019.
USPTO, Non-Final Office Action in Related Matter U.S. Appl. No. 16/135,214, dated Dec. 19, 2019.
USPTO, Non-Final Office Action in Related Matter U.S. Appl. No. 16/007,335, dated Sep. 6, 2019.
USPTO, Non-Final Office Action in Related Matter U.S. Appl. No. 16/031,797, dated Oct. 9, 2019.
USPTO, Non-Final Office Action in Related Matter U.S. Appl. No. 16/0311,772, dated Oct. 1, 2019.
USPTO, Non-Final Office Action in Related Matter U.S. Appl. No. 16/123,543, dated Oct. 9, 2019.
USPTO, Non-Final Office Action in Related Matter U.S. Appl. No. 16/135,119, dated Oct. 17, 2019.
USPTO, Notice of Allowance for U.S. Appl. No. 16/0007,204, dated Sep. 6, 2018.
Young, Bruce, Response to non-Final Office Action in Related Matter U.S. Appl. No. 16/007,335, dated Jan. 2, 2020.
Young, Bruce, Response to non-Final Office Action in Related Matter U.S. Appl. No. 16/031,772, dated Dec. 18, 2019.
Young, Bruce, Response to non-Final Office Action in Related Matter U.S. Appl. No. 16/0331,797, dated Jan. 6, 2020.
Young, Bruce, Response to non-Final Office Action in Related Matter U.S. Appl. No. 16/123,543, dated Jan. 3, 2020.
Young, Bruce, Response to non-Final Office Action in Related Matter U.S. Appl. No. 16/135,119, dated Jan. 6, 2020.
Young, Bruce, Response to non-Final Office Action in Related Matter U.S. Appl. No. 16/135,175, dated Jan. 6, 2020.
Young, Bruce, Response to non-Final Office Action in Related Matter U.S. Appl. No. 16/135,198, dated Jan. 9, 2020.
Young, Bruce, Response to non-Final Office Action in Related Matter U.S. Appl. No. 16/135,214, dated Jan. 9, 2020.
Bjerregaard, Lindsay, Consilio3D Technologies Creates New Augmented Reality Inspection Product, Retrieved from http://www.mro-network.com/software/consilio3d-technologies-creates-new-augmented-reality-inspection-product on Jun. 20, 2018.
Daqri, Smart Glasses Specifications Sheet, Mar. 15, 2018, Retrieved from https://assets.daqri.com/documents/DAQRI_Smart_Glasses_Datasheet_2018.pdf on Aug. 22, 2019.
Daqri, Smart Glasses, Retrieved from https://www.daqri.com/products/smart-glasses/ on Jun. 20, 2018.
Epson, Moverio Pro BT-200/BT-300 Smart Headset, Retrieved from https://epson.com/For-Work/Wearables/Smart-Glasses/Moverio-Pro-BT-2000-Smart-Headset-/p/V11H725020 on Jun. 20, 2018.
Farsens, EPC C1G2 Batteryless Ambient Temperature and Barometric Pressure Sensor, Jan. 2018, retrieved from http://www.farsens.com/wp-content/uploads/2018/01/DS-EVAL01-FENIX-VORTEX-RM-V03.pdf on Nov. 30, 2018.
Farsnes, EPC C1G2 Batteryless LED Indicator, Jan. 2018, retrieved from http://www.farsens.com/wp-content/uploads/2018/01/DS-EVAL01-STELLA-R-V03.pdf on Nov. 30, 2018.
LASTER Technologies, LASTER SeeThru: The First Genuine Augmented Reality Wireless Eyewear Launches on Kickstarter, Retrieved from https://www.businesswire.com/news/home/20140115005387/en/LASTER-SeeThru-Genuine-Augmented-Reality-Wireless-Eyewear on Jun. 20, 2018.
Microsoft, Hololens Overview, Retrieved from https://www.microsoft.com/en-us/hololens/commercial-overview on Jun. 20, 2018.
Microsoft, Why Hololens, Retrieved from https://www.microsoft.com/en-us/hololens/why-hololens on Jun. 20, 2018.
Occulus, Rift VR Headset, Retrieved from https://www.oculus.com/rift/?utm_campaign=%5bcampaign%6d&utm_source=google&utm_medium=cpc&gclid=Cj0KCQiAzrTUBRCnARIsAL0mqcyb5Mhp YgdQ1fl2hb0CxWcIg32N-e8B4Vv-zBcirW136-5JU3PAQaEaAkLaEALw_wcB&gclsrc=aw.ds on Jun. 20, 2018.
Osterhout Design Group, Smartglasses 7, Retrieved from http://www.osterhoutgroup.com/downloads/pdf/product/R-7HL-TechSheet.pdf on Jun. 20, 2018.
Phillips, Jon, Hands on with Laster SeeThru, a direct augmented-reality challenge to Google Glass, Retrieved from https://www.pcworld.com/article/2105865/hands-on-with-laster-seethru-a-direct-augmented-reality-challenge-to-google-glass.html on Jun. 22, 2018.
Polap, David, et al. "Obstacle Detection as a Safety Alert in Augmented Reality Models by the Use of Deep Learning Techniques." Sensors (Basel) (2017). Retrieved from https://www.ncbi.nlm.nih.gov/pmc/articles/PMC5751448/ on Jun 20, 2018.
Singularity Hub Staff, This Augmented Reality Helmet Helps Firefighters See Through Smoke to Save Lives, Retrieved from https://singularityhub.com/2017/06/28/this-augmented-reality-helmet-helps-firefighters-see-through-smoke-to-save-lives/#sm.00013g1l63cseeyjw2l1fob4gx02f on Jun. 20, 2018.
Upskill, Comm industrial equipment manufacturing use cases, Retrieved from https://upskill.io/skylight/industries/industrial-equipment/ on Jun. 20, 2018.
Upskill, Getting the Torque Just Right with Skylight Could Save Millions, Retrieved from https://upskill.io/landing/ge-aviation-case-study/ on Jun. 20, 2018.
USPTO, Final Office Action in Related Matter U.S. Appl. No. 16/007,204, dated May 17, 2019.
USPTO, Non-Final Office Action in Related Matter U.S. Appl. No. 16/007,204, dated Dec. 10, 2018.
VIVE, HTC VIVE PRO, Retrieved from https://www.vive.com/us/vive-pro-vr/?gclid=CjwKCAjwlcXXBRBhEiwApfHGTZTvHInsm DrpO7DC7pDJaBzIpsbG7a-U2iWrGgBpoiwc07DoRYThaxoCLVMQAvD_BwE on Jun. 20, 2018.
Xiang et al., Object Detection by 3D Aspectlets and Occlusion Reasoning, 4th International IEEE Workshop on 3D Representation and Recognition (3dRR), 2013.
Young, Bruce, Response to Final Office Action in Related Matter U.S. Appl. No. 16/007,204, dated Jul. 17, 2019.
Young, Bruce, Response to Non-Final Office Action in Related Matter U.S. Appl. No. 16/007,204, dated Mar. 11, 2019.
Palladino, Disney Research Creates Avatars That Can Strike a Pose to Match a Person's Movements in Augmented Reality, Jul. 23, 2018 https://next.reality.news/news/disney-research-creates-avatars-can-strike-pose-match-persons-movements-augmented-reality-0186149/.
Piumsomboon, et al., Mini-Me An Adaptive Avatar for Mixed Reality Remote Collaboration, CHI 2018, Feb. 21, 2018.
USPTO, Final Office Action in Related Matter U.S. Appl. No. 16/007,335, dated Apr. 28, 2020.
USPTO, Non-Final Office Action in Related Matter U.S. Appl. No. 16/353,847, dated Feb. 7, 2020.

(56) References Cited

OTHER PUBLICATIONS

USPTO, Non-Final Office Action in Related Matter U.S. Appl. No. 16/208,799, dated Feb. 26, 2020.
USPTO, Non-Final Office Action in Related Matter U.S. Appl. No. 16/211,061, dated Feb. 27, 2020.
USPTO, Non-Final Office Action in Related Matter U.S. Appl. No. 16/353,885, dated Mar. 18, 2020.
USPTO, Notice of Allowance in Related Matter U.S. Appl. No. 16/031,797, dated Feb. 21, 2020.
USPTO, Notice of Allowance in Related Matter U.S. Appl. No. 16/135,119, dated Feb. 10, 2020.
USPTO, Notice of Allowance in Related Matter U.S. Appl. No. 16/135,214, dated Feb. 7, 2020.
Young, Bruce, Response to Final Office Action in Related Matter U.S. Appl. No. 16/135,119, dated Jan. 31, 2020.
USPTO, Final Office Action in Related Matter U.S. Appl. No. 16/0311,772, dated Feb. 3, 2020.
USPTO, Non-Final Office Action in Related Matter U.S. Appl. No. 116/358,482, dated Apr. 9, 2020.
USPTO, Non-Final Office Action in Related Matter U.S. Appl. No. 16/353,495, dated Apr. 9, 2020.
Young, Bruce, Response to Final Office Action in Related Matter U.S. Appl. No. 16/123,543 dated May 18, 2020.
Young, Bruce, Response to Non-Final Office Action in Related Matter U.S. Appl. No. 15/353,847, dated May 7, 2020.
St Clair A, et al., Investigating the effects of visual saliency on deictic gesture production by a humanoid robot. 2001 RO-MAN. Proceedings of the 20th IEEE International Symposium in Robot and Human Interactive Communication; 2011b Jul. 31-Aug. 3; Atlanta, GA. Piscataway (NJ): IEEE; c2011. p. 210-216. Retrieved from https://robotics.usc.edu/publications/downloads/pub/731/ on Oct. 19, 2020.
USPTO, Final Office Action in Related Matter U.S. Appl. No. 16/208,799, dated Jul. 14, 2020.
USPTO, Final Office Action in Related Matter U.S. Appl. No. 16/211,061, dated Jul. 23, 2020.
USPTO, Final Office Action in Related Matter U.S. Appl. No. 16/353,885, dated Sep. 10, 2020.
USPTO, Non-Final Office Action in Related Matter U.S. Appl. No. 16/123,543, dated Jun. 2, 2020.
USPTO, Non-Final Office Action in Related Matter U.S. Appl. No. 16/208,799, dated Oct. 2, 2020.
USPTO, Notice of Allowance in Related Matter U.S. Appl. No. 16/135,175, dated Aug. 5, 2020.
USPTO, Notice of Allowance in Related Matter U.S. Appl. No. 16/135,198, dated Jun. 5, 2020.
USPTO, Notice of Allowance in Related Matter U.S. Appl. No. 16/353,847, dated Aug. 17, 2020.
USPTO, Notice of Allowance in Related Matter U.S. Appl. No. 16/358,495, dated Sep. 21, 2020.
USPTO, Notice of Allowance in Related Matter U.S. Appl. No. 16/0311,772, dated Jun. 24, 2020.
USPTO, Notice of Allowance in Related Matter U.S. Appl. No. 16/123,543, dated Sep. 16, 2020.
Young, Bruce, Response to Final Office Action in Related Matter U.S. Appl. No. 16/007,335, dated Jul. 28, 2020.
Young, Bruce, Response to Final Office Action in Related Matter U.S. Appl. No. 16/031,772, dated Jun. 1, 2020.
Young, Bruce, Response to Final Office Action in Related Matter U.S. Appl. No. 16/135,198, dated May 29, 2020.
Young, Bruce, Response to Final Office Action in Related Matter U.S. Appl. No. 16/208,799, dated Sep. 17, 2020.
Young, Bruce, Response to Final Office Action in Related Matter U.S. Appl. No. 16/211,061, dated Sep. 17, 2020.
Young, Bruce, Response to non-Final Office Action in Related Matter U.S. Appl. No. 16/123,543, dated Jul. 25, 2020.
Young, Bruce, Response to non-Final Office Action in Related Matter U.S. Appl. No. 16/135,175, dated Jun. 26, 2020.
Young, Bruce, Response to Non-Final Office Action in Related Matter U.S. Appl. No. 16/208,799, dated May 26, 2020.
Young, Bruce, Response to non-Final Office Action in Related Matter U.S. Appl. No. 16/211,061, dated May 26, 2020.
Young, Bruce, Response to Non-Final Office Action in Related Matter U.S. Appl. No. 16/358,482, dated Aug. 10, 2020.
Young, Bruce, Response to Non-Final Office Action in Related Matter U.S. Appl. No. 16/358,495, dated Aug. 5, 2020.
Young, Bruce, Response to Non-Final Office Action in Related Matter 160353,885 dated Jun. 18, 2020.
Young, Bruce, Supplemental Amendment in Related Matter U.S. Appl. No. 16/358,482, dated Aug. 28, 2020.
Young, Bruce, Supplemental Response in Related Matter U.S. Appl. No. 16/358,495, dated Aug. 26, 2020.
YouTube Video, How to Convert a selection into a layer mask in Photoshop CS6 | lynda.com, played from https://www.youtube.com/watch?v=3F4XUS45MUk on Jun. 2, 2020, Uploaded to YouTube on Jun. 15, 2015, Transcript and Screenshots submitted.
Nintendo ("Just Dance 2018—Launch trailer", 2017, https://www.youtube.com/watch?v=xXS0LP1SSr4) (Year:2017).
USPTO, Non-Final Office Action for Related Matter U.S. Appl. No. 16/007,335, dated Dec. 24, 2020.
USPTO, Non-Final Office Action in related matter, U.S. Appl. No. 16/353,885, dated Nov. 27, 2020.
USPTO, Notice of Allowance for Related Matter U.S. Appl. No. 16/211,061, dated Dec. 24, 2020.
USPTO, Notice of Allowance in Related Matter 116/358,482, dated Nov. 18, 2020.
Young, Bruce, Response to Final Office Action in Related Matter U.S. Appl. No. 16/208,799, dated Nov. 19, 2020.
Young, Bruce, Response to Final Office Action in Related Matter 160353,885 dated Nov. 6, 2020.
Young, Bruce, Response to Non-Final Office Action in Related Matter 160353,885 dated Feb. 4, 2021.
Young, Bruce, Response to Final Office Action in Related Matter U.S. Appl. No. 16/353,885 dated Nov. 6, 2020.

\* cited by examiner

BODY POSE MESSAGE SYSTEM

BACKGROUND

Technical Field

The present subject matter relates to using a Virtual Reality (VR) or Augmented Reality (AR) system to allow other personnel to provide messages to a device without using a network communications link.

Background Art

Many situations require the presentation information to a user in a way that the user can receive the information when it is needed and ensures that the user acts accordingly. One of many different professions where this is important is for emergency responders where the ability to receive the right information at the right time can be a matter of life or death. Traditionally, emergency responders have relied on audio transmissions over a radio for a majority of their information, but that is changing with the advent of widespread wireless digital communication.

Another new technology that is making its way into the world of emergency responders is digital displays. These displays may be on a handheld device, such as a mobile phone, or on a head-mounted display (HMD), such as a virtual reality (VR) display or an augmented reality (AR) display, which may be integrated into their emergency equipment, such as their helmet. Textual information can be presented to the emergency responder through the display and the information can be updated in real-time through the digital wireless interface from a command center or other information sources.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1A:
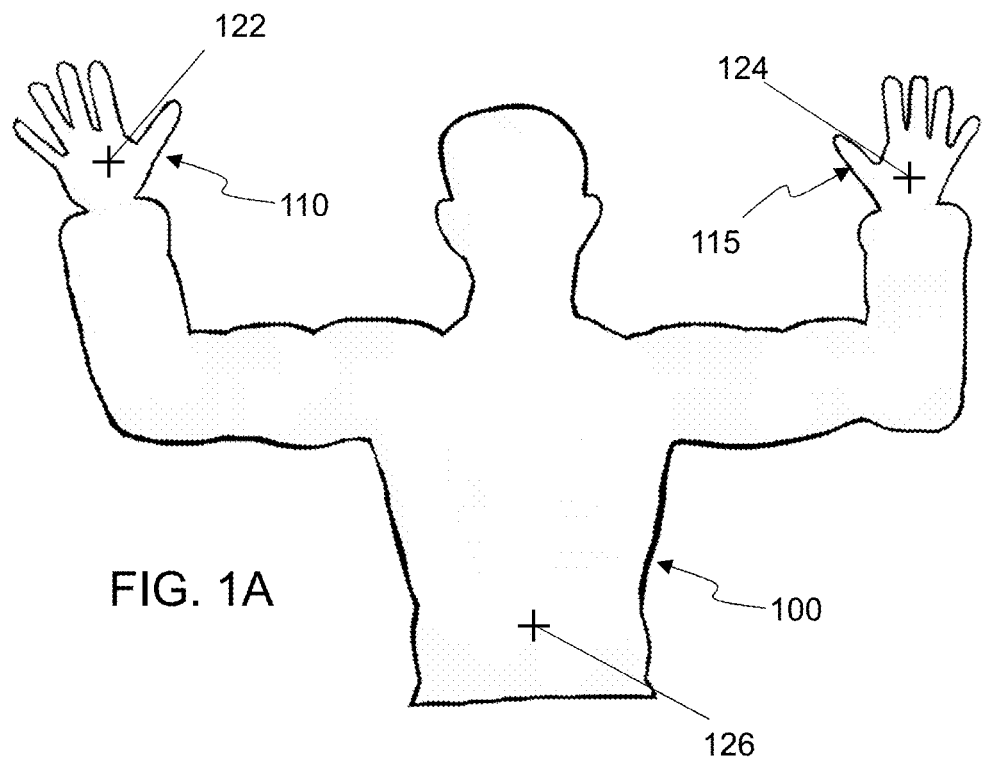
FIG. 1A shows a scene on the display of an embodiment of a head-mounted display depicting a first body pose detected using body parts.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Hybrid-reality (HR), as the phrase is used herein, refers to an image that merges real-world imagery with imagery created in a computer, which is sometimes called virtual imagery. While an HR image can be a still image, it can also be a moving image, such as imagery created using a video stream. HR can be displayed by a traditional two-dimensional display device, such as a computer monitor, one or more projectors, or a smartphone screen. An HR system can be based on a device such as a microscope, binoculars, or a telescope, with virtual imagery is superimposed over the image captured by the device. In such HR systems, an eyepiece of a device may be considered the display of the system. HR imagery can also be displayed by a head-mounted display (HMD). Many different technologies can be used in an HMD to display HR imagery. A virtual reality (VR) HMD system may receive images of a real-world object, objects, or scene, and composite those images with a virtual object, objects, or scene to create an HR image. An augmented reality (AR) HMD system may present a virtual object, objects, or scene on a transparent screen which then naturally mixes the virtual imagery with a view of a scene in the real-world. A display which mixes live video with virtual objects is sometimes denoted AR, but for the purposes of this disclosure, an AR HMD includes at least a portion of the display area that is transparent to allow at least some of the user's view of the real-world to be directly viewed through the transparent portion of the AR HMD. The display used by an HR system represents a scene which is a visible portion of the whole environment. As used herein, the term "scene" and "field of view" (FOV) are used to indicate what is visible to a user.

The word "occlude" is used herein to mean that a pixel of a virtual element is mixed with an image of another object to change the way the object is perceived by a viewer. In a VR HMD, this can be done through use of a compositing process to mix the two images, a Z-buffer technique to remove elements of the image that are hidden from view, a painter's algorithm to render closer objects later in the rendering process, or any other technique that can replace a pixel of the image of the real-world object with a different pixel value generated from any blend of real-world object pixel value and an HR system determined pixel value. In an AR HMD, the virtual object occludes the real-world object if the virtual object is rendered, transparently or opaquely, in the line of sight of the user as they view the real-world object. In the following description, the terms "occlude", "transparency", "rendering" and "overlay" are used to denote the mixing or blending of new pixel values with existing object pixel values in an HR display.

In some embodiments of HR systems, there are sensors which provide the information used to render the HR imagery. A sensor may be mounted on or near the display, on the viewer's body, or be remote from the user. Remote sensors may include, but are not limited to, fixed sensors attached in an environment, sensors attached to robotic extensions, sensors attached to autonomous or semi-autonomous drones, or sensors attached to other persons. Data from the sensors may be raw or filtered. Data from the sensors may be transmitted wirelessly or using a wired connection.

Sensors used by some embodiments of HR systems include, but are not limited to, a camera that captures images in the visible spectrum, an infrared depth camera, a microphone, a sound locator, a Hall effect sensor, an air-flow meter, a fuel level sensor, an oxygen sensor, an electronic nose, a gas detector, an anemometer, a mass flow sensor, a Geiger counter, a gyroscope, an infrared temperature sensor, a flame detector, a barometer, a pressure sensor, a pyrometer, a time-of-flight camera, radar, or lidar. Sensors in some HR system embodiments that may be attached to the user include, but are not limited to, a biosensor, a biochip, a heartbeat sensor, a pedometer, a skin resistance detector, or skin temperature detector.

The display technology used by an HR system embodiment may include any method of projecting an image to an eye. Conventional technologies include, but are not limited to, cathode ray tube (CRT), liquid crystal display (LCD), light emitting diode (LED), plasma, or organic LED (OLED) screens, or projectors based on those technologies or digital micromirror devices (DMD). It is also contemplated that virtual retina displays, such as direct drawing on the eye's retina using a holographic grating, may be used. It is also contemplated that direct machine to brain interfaces may be used in the future.

The display of an HR system may also be an HMD or a separate device, such as, but not limited to, a hand-held mobile phone, a tablet, a fixed monitor or a TV screen.

The connection technology used by an HR system may include any physical link and associated protocols, such as, but not limited to, wires, transmission lines, solder bumps, near-field connections, infra-red connections, or radio frequency (RF) connections such as cellular, satellite or Wi-Fi® (a registered trademark of the Wi-Fi Alliance). Virtual connections, such as software links, may also be used to connect to external networks and/or external compute.

In many HR embodiments, aural stimuli and information may be provided by a sound system. The sound technology may include monaural, binaural, or multi-channel systems. A binaural system may include a headset or another two-speaker system but may also include systems with more than two speakers directed to the ears. The sounds may be presented as 3D audio, where each sound has a perceived position in space, achieved by using reverberation and head-related transfer functions to mimic how sounds change as they move in a particular space.

In many HR system embodiments, objects in the display may move. The movement may be due to the user moving within the environment, for example walking, crouching, turning, or tilting the head. The movement may be due to an object moving, for example a dog running away, a car coming towards the user, or a person entering the FOV. The movement may also be due to an artificial movement, for example the user moving an object on a display or changing the size of the FOV. In one embodiment, the motion may be due to the user deliberately distorting all or part of the FOV, for example adding a virtual fish-eye lens. In the following description, all motion is considered relative; any motion may be resolved to a motion from a single frame of reference, for example the user's viewpoint.

When there is motion in an HR system, the perspective of any generated object overlay may be corrected so that it changes with the shape and position of the associated real-world object. This may be done with any conventional point-of-view transformation based on the angle of the object from the viewer; note that the transformation is not limited to simple linear or rotational functions, with some embodiments using non-Abelian transformations. It is contemplated that motion effects, for example blur or deliberate edge distortion, may also be added to a generated object overlay.

In some HR embodiments, images from cameras, whether sensitive to one or more of visible, infra-red, or microwave spectra, may be processed before algorithms are executed. Algorithms used after image processing for embodiments disclosed herein may include, but are not limited to, object recognition, motion detection, camera motion and zoom detection, light detection, facial recognition, text recognition, or mapping an unknown environment. The image processing may also use conventional filtering techniques, such as, but not limited to, static, adaptive, linear, non-linear, and Kalman filters. Deep-learning neural networks may be trained in some embodiments to mimic functions which are hard to create algorithmically. Image processing may also be used to prepare the image, for example by reducing noise, restoring the image, edge enhancement, or smoothing.

In some HR embodiments, objects may be detected in the FOV of one or more cameras. Objects may be detected by using conventional algorithms, such as, but not limited to, edge detection, feature detection (for example surface patches, corners and edges), greyscale matching, gradient matching, pose consistency, or database look-up using geometric hashing. Genetic algorithms and trained neural networks using unsupervised learning techniques may also be used in embodiments to detect types of objects, for example people, dogs, or trees.

In embodiments of an HR system, object may be performed on a single frame of a video stream, although techniques using multiple frames are also envisioned. Advanced techniques, such as, but not limited to, Optical Flow, camera motion, and object motion detection may be used between frames to enhance object recognition in each frame.

After object recognition, rendering the object may be done by the HR system embodiment using databases of similar objects, the geometry of the detected object, or how the object is lit, for example specular reflections or bumps.

In some embodiments of an HR system, the locations of objects may be generated from maps and object recognition from sensor data. Mapping data may be generated on the fly using conventional techniques, for example the Simultaneous Location and Mapping (SLAM) algorithm used to estimate locations using Bayesian methods, or extended Kalman filtering which linearizes a non-linear Kalman filter to optimally estimate the mean or covariance of a state (map), or particle filters which use Monte Carlo methods to estimate hidden states (map). The locations of objects may also be determined a priori, using techniques such as, but not limited to, reading blueprints, reading maps, receiving GPS locations, receiving relative positions to a known point (such as a cell tower, access point, or other person) determined using depth sensors, WiFi time-of-flight, or triangulation to at least three other points.

Gyroscope sensors on or near the HMD may be used in some embodiments to determine head position and to generate relative motion vectors which can be used to estimate location.

In embodiments of an HR system, sound data from one or microphones may be processed to detect specific sounds. Sounds that might be identified include, but are not limited to, human voices, glass breaking, human screams, gunshots, explosions, door slams, or a sound pattern a particular machine makes when defective. Gaussian Mixture Models and Hidden Markov Models may be used to generate statistical classifiers that are combined and looked up in a database of sound models. One advantage of using statistical classifiers is that sounds can be detected more consistently in noisy environments.

In some embodiments of an HR system, eye tracking of one or both viewer's eyes may be performed. Eye tracking may be used to measure the point of the viewer's gaze. In an HMD, the position of each eye is known, and so there is a reference frame for determining head-to-eye angles, and so the position and rotation of each eye can be used to estimate the gaze point. Eye position determination may be done using any suitable technique and/or device, including, but not limited to, devices attached to an eye, tracking the eye position using infra-red reflections, for example Purkinje images, or using the electric potential of the eye detected by electrodes placed near the eye which uses the electrical field generated by an eye independently of whether the eye is closed or not.

In some HR embodiments, input is used to control the HR system, either from the user of the HR system or from external actors. The methods of input used varies by embodiment, and each input type may control any or a subset of an HR system's function. For example, in some embodiments gestures are used as control input. A gesture may be detected by using other systems coupled to the HR system, such as, but not limited to, a camera, a stereo camera, a depth camera, a wired glove, or a controller. In some embodiments using a camera for gesture detection, the video stream is analyzed to detect the position and movement of an object, for example a hand, a finger, or a body pose. The position and motion can be used to generate a 3D or 2D path and, by using stochastic or pattern matching techniques, determine the most likely gesture used.

In another example embodiment, the user's head position and movement may be used as a gesture or direct control. The head position and movement may be determined by gyroscopes mounted into an HMD. In another example, a fixed source such as an electromagnetic beam may be affixed to a user or mounted in an HMD; coupled sensors can then track the electromagnetic beam as the user's head is moved.

In yet other example embodiments, the user may have a touch-pad or a plurality of touch sensors affixed to the body, for example built-in to a glove, a suit, or an HMD, coupled to the HR system. By touching a specific point, different input data can be generated. Note that the time of a touch or the pattern of touches may also generate different input types. In some technologies, touchless sensors using a proximity to the sensor can be used.

In some embodiments a physical input device is coupled to the HR system. The physical input device may be a mouse, a pen, a keyboard, or a wand. If a wand controller is used, the HR system tracks the position and location of the wand as well as presses of any buttons on the wand; the wand may be tracked using a camera, for example using object boundary recognition, using target tracking where a specific shape or target is detected in each video frame, or by wired/wireless data from the wand received by the HR system. In other example embodiments, a physical input device may be virtual, where a device is rendered on the head-mounted display and the user interacts with the virtual controller using other HR systems, such as, but not limited to, gaze direction, hand tracking, finger tracking, or gesture detection. In embodiments which use gaze direction as input, interaction with virtual menus rendered on the display may be used.

Further, in another example embodiment, a backwards-facing camera mounted in an HMD may be used to detect blinking or facial muscle movement. By tracking blink patterns or facial muscle motion, input gestures can be determined.

As used herein, a "situation" of an object may refer to any aspect of the objects position and/or orientation in three-dimensional space. The situation may refer to any value of an object's six degrees of freedom, such as up/down, forward/back, left/right, roll, pitch, and yaw. In some cases, the situation of an object may refer to only the position of an object with respect to a 3-dimensional axis without referring to its orientation (e.g. roll, pitch, and yaw), or the situation may refer only to the object's orientation without referring to its position. But other cases, the situation of the object may refer to one or more position and/or orientation values. In some cases, the situation of the object may also include an aspect of its velocity or acceleration vector such as the speed or direction of movement of the object.

In some embodiments, breathing patterns may be detected using a pressure sensor mounted in a breathing system coupled to the HR system to detect changes in pressure. Breath patterns such as, but not limited to, blowing softly, exhaling hard, or inhaling suddenly may be used as input data for an HR control system.

In yet other example embodiments, sounds may be detected by one or more microphones coupled to the HR system. Specific sounds, such as, but limited to, vocalizations (e.g. scream, shout, lip buzz, snort, whistle), stamping, or clapping, may detected using stochastic or pattern matching techniques on received audio data. In some embodiments, more than one microphone may be used to place a sound in a location, allowing the position of a sound, for example a clap, to provide additional input control data. In some embodiments, voice control using natural language is used; speech recognition techniques such as trained neural networks or hidden Markov model algorithms are used by an HR system to determine what has been said.

It is anticipated that direct neural interfaces may be used in some embodiments to control an HR system.

Turning now to the current disclosure, systems that display HR imagery are becoming increasingly common and are making their way from entertainment and gaming into industrial and commercial applications. Examples of systems that may find HR imagery useful include aiding a person doing a task in a hazardous environment, for example repairing machinery, neutralizing danger, or responding to an emergency.

Many of the same environments where HR imagery might be used may have intermittent or no network connectivity. In these environments safety is a priority, and so simple signaling between team members is an imperative. Accordingly, systems and methods for allowing signals to be transmitted without required an active network communications link may be useful.

An HR system may be used to track the motion of other personnel in the environment using sensors. The body shape of a team member may be determined using sensors to provide a method of relaying information. The tracking of personnel using line-of-sight cameras is disclosed herein, along with techniques for tracking personnel who are out of direct sight lines. An HR system may also be used in conjunction with other systems to relay information where network connectivity is not available at each hop.

A body may be detected by an embodiment of HR system using object recognition from a video feed. Detecting human bodies in a video may be done using a trained neural network, as is done in many smartphones today. Note that in some embodiments the camera may be pointing forward from the user wearing the headset (corresponding to the user's current field of view), pointing to the side or behind of the user, or from a camera with a wide-angle view or an array of cameras generating a wide angle view up to and including a 360° view. In some embodiments, the video feed is transmitted to the HR system using a network from other cameras in the environment.

In some embodiments, a sensor detecting non-visible light may be used to generate the video feed. For example, an infra-red camera may be used to "see through" obscuring atmosphere, such as smoke or water vapor. In another example, ultra-high-frequency sensors may be used to "see through" solid barriers such as walls or ceilings.

In some embodiments the sensor is not being carried by the user of an HR system. An external sensor may be carried by another team member, mounted on a drone or robot, or fixed in the environment, to give three non-limiting examples. The body detection processing may be done using computing resources within the HR system, using an external computing resource with a result of body detection computation transmitted to the HR system using a network connection, or some combination thereof.

Note that if a network connection is used to transmit data from an external sensor to an HR system, there is no requirement that the person signaling is connected to the HR system. In some scenarios, there may be a network connection between team members, but the signaler may be occupied interacting with an HR system, for example using voice commands, eye gaze, and muscle twitch. In these scenarios, a body pose command does not interrupt or block the signaler's input systems and is quick and easy to perform, and so is advantageous.

In some potential scenarios, an electronic network connection from the signaler may be available but may be very low bandwidth or extremely intermittent. In these scenarios, an example HR system may transmit a single, small packet with error correction parity that indicates that a sequence of body pose commands is to be performed. The packet may then be received by other HR systems in the vicinity to start body pose detection algorithms.

When creating and detecting a body pose using an example embodiment, one or more factors may be used to determine whether a pose is present, such as, but not limited to, keeping one or more body parts fixed in space for a minimum period of time, maintaining a relationship between two or more body parts (e.g. a subtended angle from center of body between two hands), or tracing a known path using one or body parts (e.g. a gesture). In some scenarios, a single body pose may not have 100% accurate detection because of adverse environmental conditions. To increase the success rate of detecting a body pose, some embodiments may require a sequence or combination of separate body poses to be valid.

In example embodiments, the detection of the body pose may generate a system message, such as, but not limited to, alerts, actions or commands, by looking up an associated action in a database using the pose as an index; in some embodiments, the database may be loaded beforehand to define the actions specific to a particular mission.

In some embodiments, the detection of the body pose does not generate a system action directly, allowing the HR system user to interpret the meaning of the pose. In some of these embodiments, the HR system renders an identifier on the display, for example an icon or text describing the detected pose. In other embodiments, the HR may highlight the body parts used during a pose to aid pose recognition by the HR system user, such as, but not limited to, adding color, increasing brightness, increasing the size, or adding virtual elements (e.g. a beam).

In some embodiments, the detection of a body pose may be performed by determining the positions and motions of targets attached to a signaler, such as, but not limited to, registration marks, infra-red sensitive paint, or low-power fixed transmitters. When a low-power transmitter is affixed to a moving body, a more limited sensor may be used some HR embodiments. In some example embodiments the registration mark may be an unnatural shape not encountered in an environment, for example a cross, a bullseye, or a barcode. In some embodiments, the registration mark may be made using infra-red reflective paint, allowing the marks easily to be detected in a dark environment or an environment full of obscuring particulate matter or water vapor.

The facility of some HR embodiments to use a body pose to relay a message as described herein creates the potential to combine the facility with other devices to bridge connectivity gaps in a network, either because of bandwidth overload, no connection or intermittent connection. For example, a lack of a network connection between two team members can be bridged by using simple body pose messages. In a further example, a team member can communicate a body pose to a sensor on a device connected to the network. Note that a network gap can be bridged at the start of a communication, at the end of a communication, or at any point or points in between. In some scenarios, a network gap can be bridged by sending a "do body pose" message to a connected team member, so creating a connection to a device not connected to the previous network.

FIG. 1A shows a scene on the display of an embodiment of a head-mounted display showing a body 100 in a first situation. In some embodiments, an HR system may detect the presence of body 100 and the presence of hands 110, 115 using object detection. Once detected, an HR system may generate key positions 122, 124, 126 corresponding to a left hand, a right hand and a torso, which may also be referred to as a body center, trunk, stomach, or chest. The HR system may deduce a first pose using the distance between the key points and/or the angles in the formed triangle.

Figure 1B:
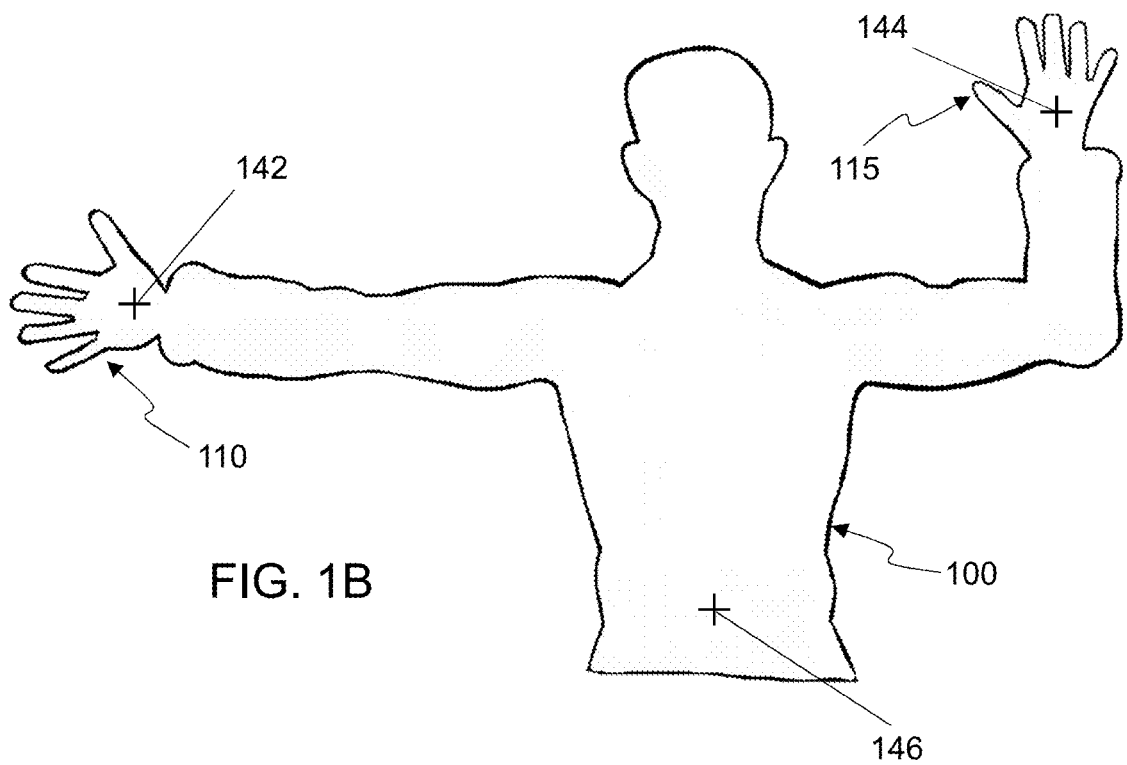
FIG. 1B shows a scene on the display of an embodiment of a head-mounted display depicting a second body pose detected using body parts.

FIG. 1B shows a scene on the display of an embodiment of a head-mounted display showing the body 100 in a second situation. In some embodiments, an HR system may detect the presence of the body 100 and the presence of the hands 110, 115 using object detection. Once detected, an HR system may generate key positions 142, 144, 146 corresponding to the left hand, the right hand and the torso. The HR system may deduce a second pose using the distance between the key points and/or the angles in the formed triangle. Note that the second pose detected at the time of FIG. 1B is different from the first pose depicted at the time of FIG. 1A.

Figure 1C:
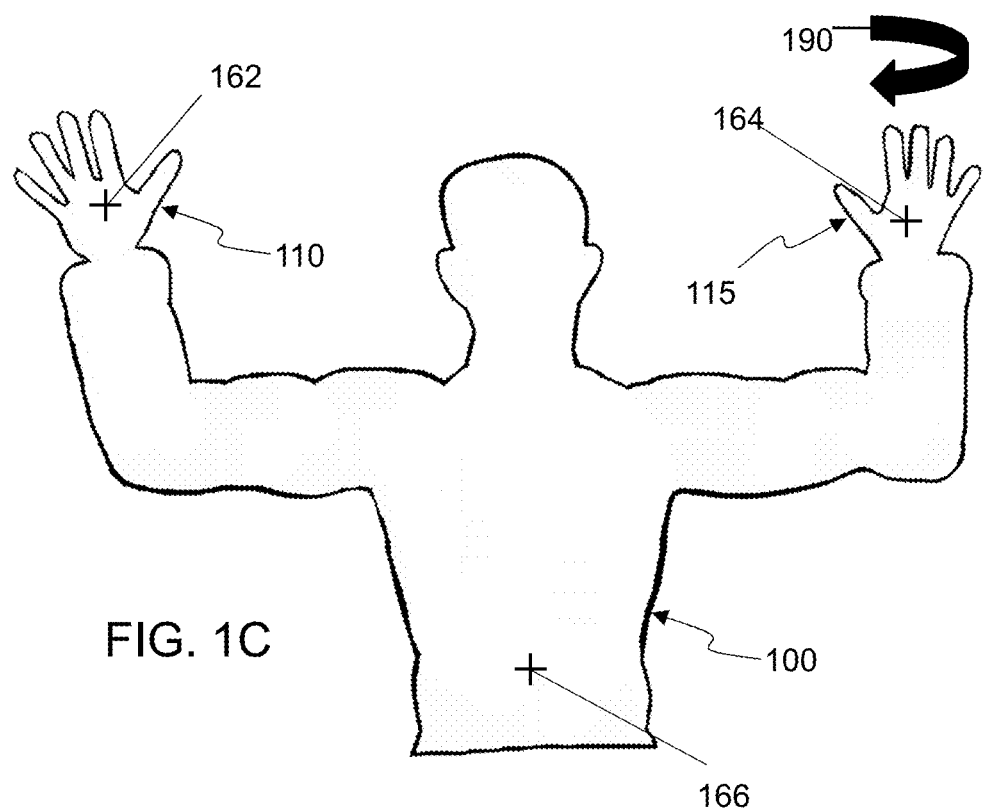
FIG. 1C shows a scene on the display of an embodiment of a head-mounted display depicting a third body pose detected using body parts.

FIG. 1C shows a scene on the display of an embodiment of a head-mounted display showing the body 100 in a third situation. In some embodiments, an HR system may detect the presence of the body 100 and the presence of the hands 110, 115 using object detection. Once detected, an HR system may generate key positions 162, 164, 166 corresponding to the left hand, the right hand and the torso. The HR system may deduce a third pose using the distance between the key points and/or the angles in the formed triangle. In the third pose shown in FIG. 1C, key position 164 is not static, but rotates in a clockwise direction as indicated by arrow 190. Note that the third pose detected at the time of FIG. 1C is interpreted differently from the first pose depicted at the time of FIG. 1A because of the motion 190 even though the triangle formed by key points 162, 164, 166 is similar to triangle 122, 124, 126.

Figure 1D:
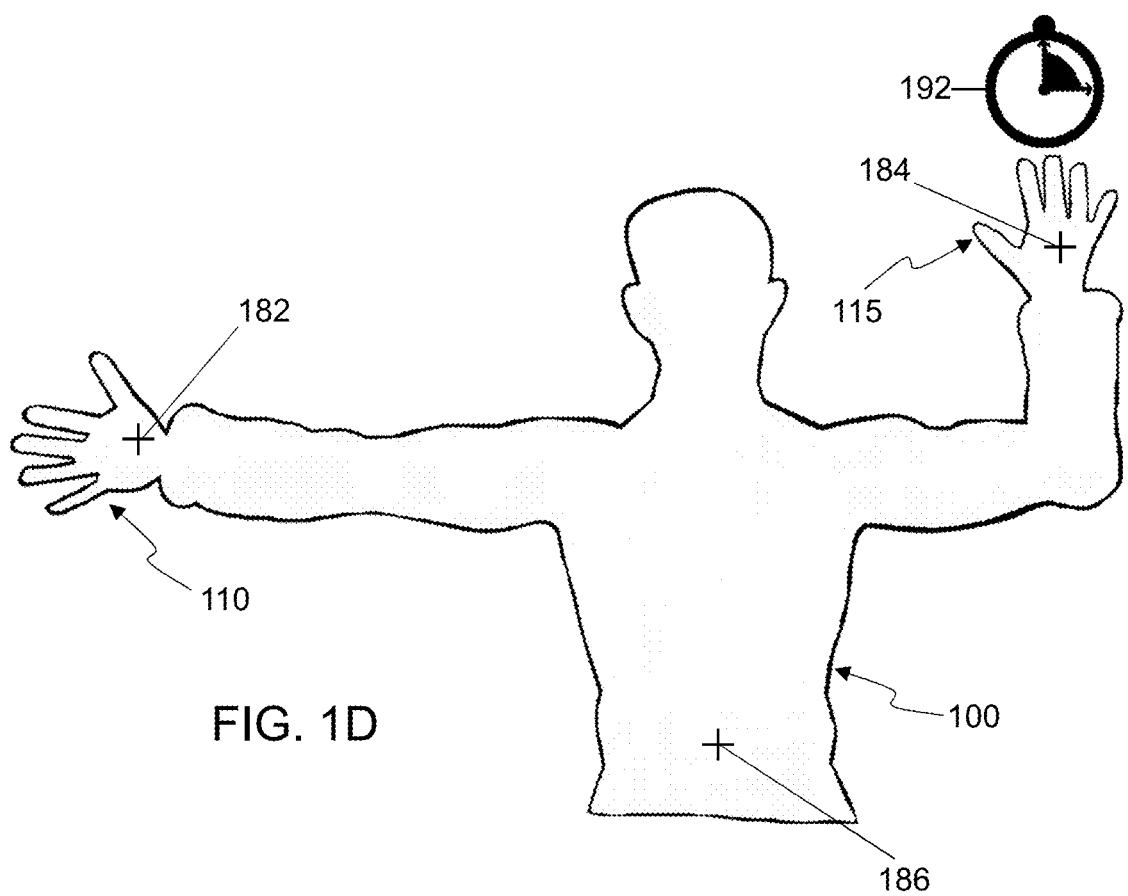
FIG. 1D shows a scene on the display of an embodiment of a head-mounted display depicting a fourth body pose detected using body parts.

FIG. 1D shows a scene on the display of an embodiment of a head-mounted display showing the body 100 in a fourth situation. In some embodiments, an HR system may detect the presence of the body 100 and the presence of the hands 110, 115 using object detection. Once detected, an HR system may generate key positions 182, 184, 186 corresponding to the left hand, the right hand and the torso. The HR system may deduce the fourth pose using the distance between the key points and/or the angles in the formed triangle. In the fourth pose shown in FIG. 1D, key position 184 is held for a fixed time as indicated by stopwatch 192. Note that the fourth pose detected at the time of FIG. 1D is interpreted differently from the second pose depicted at the time of FIG. 1B even though the triangle formed by key points 182, 184, 186 is similar to triangle 142, 144, 146 because the pose is held for a specific time 192. In some embodiments, the time 192 may be a maximum time or a minimum time.

Figure 2A:
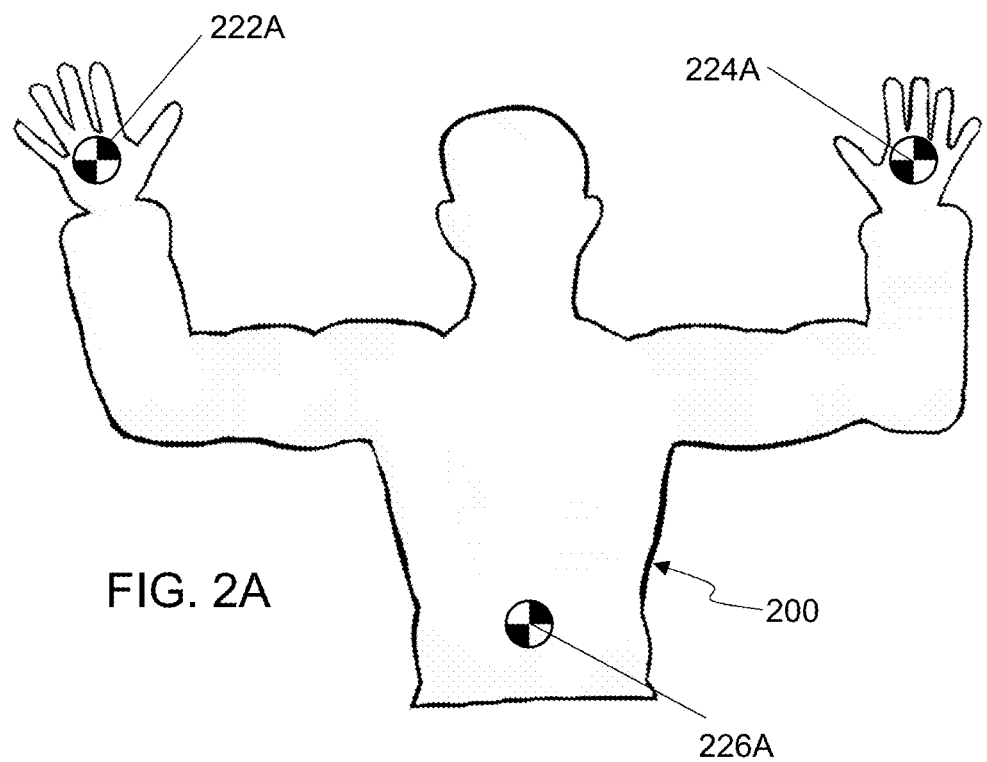
FIG. 2A shows a scene on the display of an embodiment of a head-mounted display depicting a first body pose detected using body targets.

FIG. 2A shows a scene on the display of an embodiment of a head-mounted display showing a body 200 in a first situation. In some embodiments, targets 222A, 224A, 226A corresponding to a left hand, a right hand and torso position are positioned on the body and visible to at least one sensor. An HR system may detect the presence of targets 222A, 224A, 126A using object detection. Once detected, an HR system may generate key positions associated with the targets 222A, 224A, 226A. The HR system may deduce a first pose using the distance between the key points and/or the angles in the formed triangle.

Figure 2B:
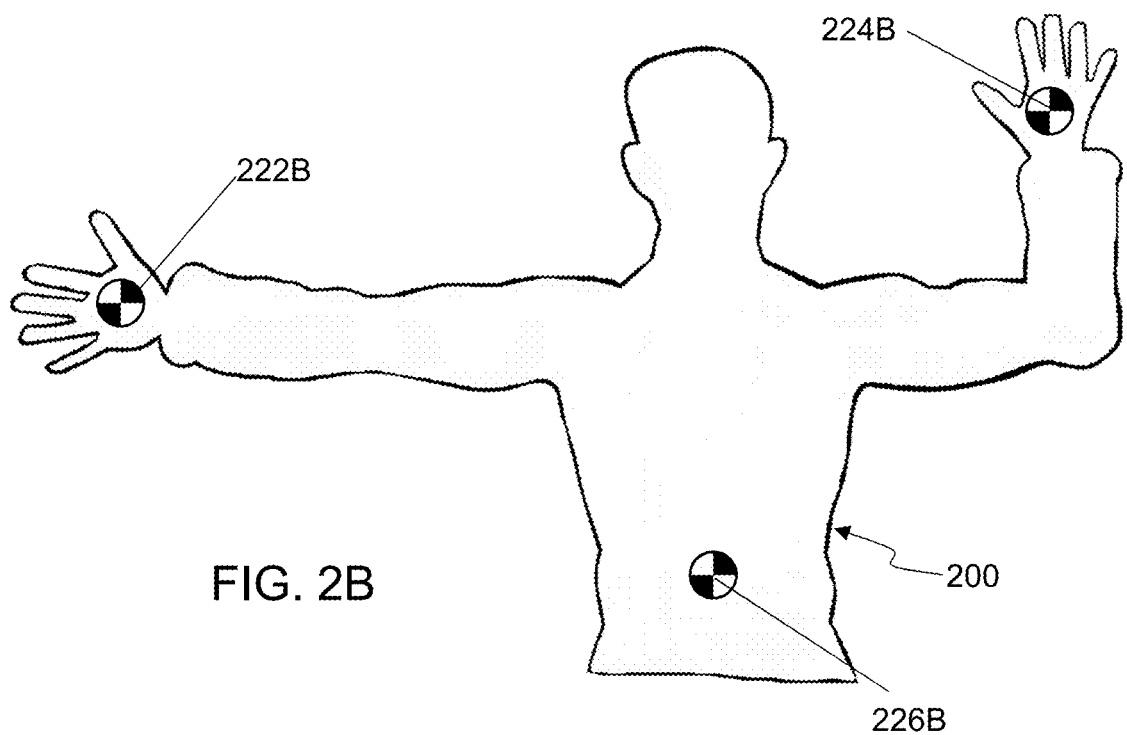
FIG. 2B shows a scene on the display of an embodiment of a head-mounted display depicting a second body pose detected using body targets.

FIG. 2B shows a scene on the display of an embodiment of a head-mounted display showing the body 200 in a second situation. In some embodiments, targets 222B, 224B, 226B corresponding to the left hand, the right hand and the torso position are positioned on the body and visible to at least one sensor. An HR system may detect the presence of targets 222B, 224B, 226B using object detection. Once detected, an HR system may generate key positions associated with targets 222B, 224B, 226B. The HR system may deduce a second pose using the distance between the key points and/or the angles in the formed triangle. Note that the second pose detected at the time of FIG. 2B is different from the first pose depicted at the time of FIG. 2A.

Figure 2C:
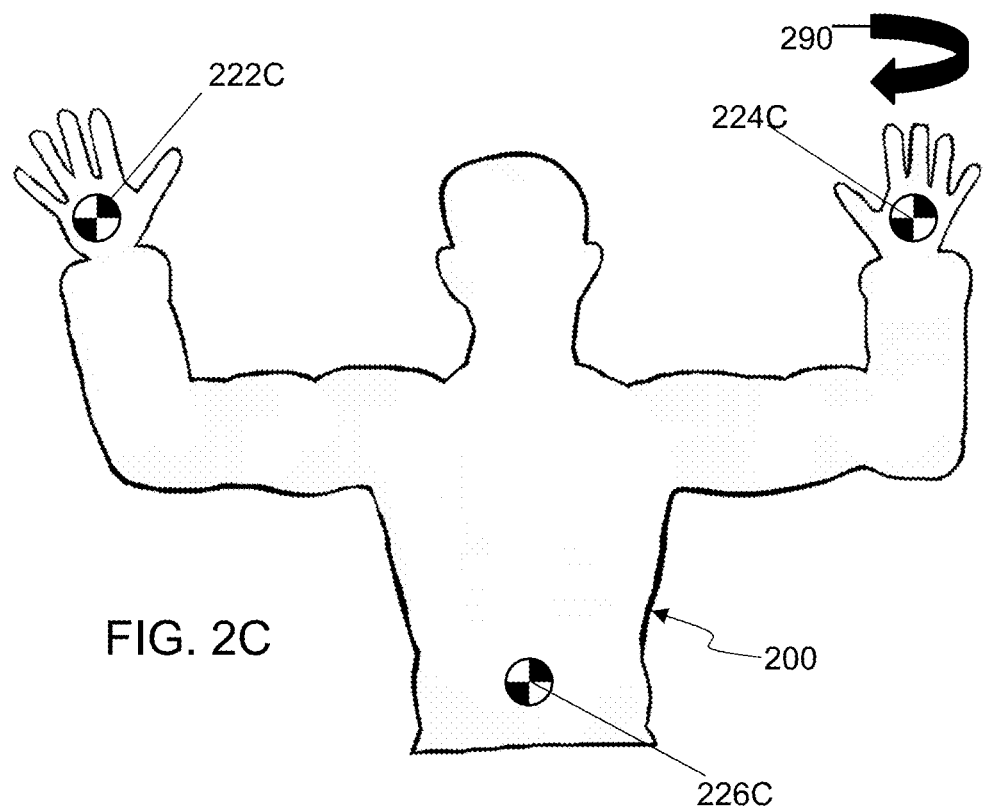
FIG. 2C shows a scene on the display of an embodiment of a head-mounted display depicting a third body pose detected using body targets.

FIG. 2C shows a scene on the display of an embodiment of a head-mounted display showing a body 200 in a third situation. In some embodiments, targets 222C, 224C, 226C corresponding to the left hand, the right hand and the torso position are positioned on the body and visible to at least one sensor. An HR system may detect the presence of targets 222C, 224C, 226C using object detection. Once detected, an HR system may generate key positions associated with targets 222C, 224C, 226C. The HR system may deduce a third pose using the distance between the key points and/or the angles in the formed triangle. In the third pose shown in FIG. 2C, key position 264 is not static, but rotates in a clockwise direction as indicated by arrow 290. Note that the third pose detected at the time of FIG. 2C is interpreted differently from the first pose depicted at the time of FIG. 2A because of the motion 290 even though the triangle formed by key points associated with targets 222C, 224C, 226C is similar to triangle 222A, 224A, 226A.

Figure 2D:
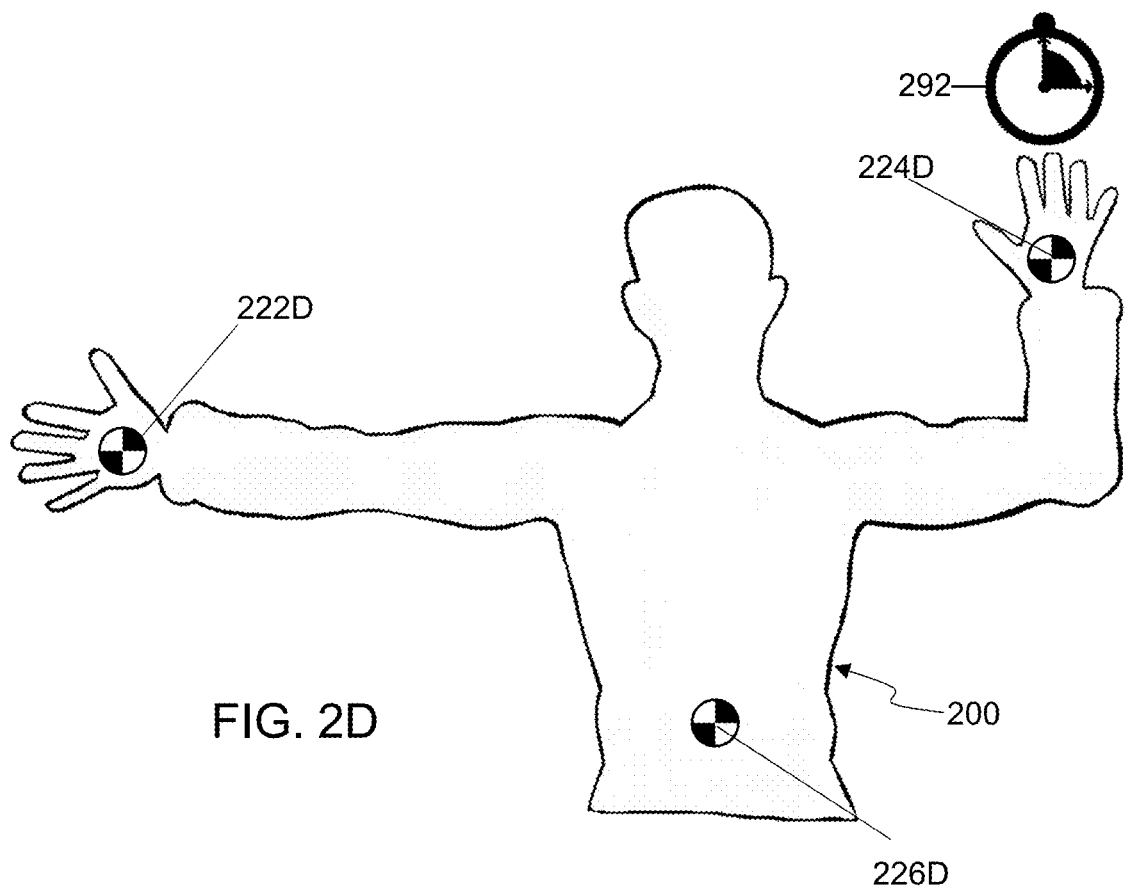
FIG. 2D shows a scene on the display of an embodiment of a head-mounted display depicting a fourth body pose detected using body targets.

FIG. 2D shows a scene on the display of an embodiment of a head-mounted display showing a body 200 in a fourth situation. In some embodiments, targets 222D, 224D, 226D corresponding to the left hand, the right hand and the torso position are positioned on the body and visible to at least one sensor. An HR system may detect the presence of targets 222D, 224D, 226D using object detection. Once detected, an HR system may generate key positions associated with 222D, 224D, 226D corresponding to a left hand, a right hand and torso. The HR system may deduce a pose using the distance between the key points and/or the angles in the formed triangle. In the fourth pose shown in FIG. 2D, key position 284 is held for a fixed time as indicated by stopwatch 292. Note that the pose detected at the time of FIG. 2D is interpreted differently from the pose depicted at the time of FIG. 2B even though the triangle formed by key points associated with targets 222D, 224D, 226D is similar to triangle 242B, 244B, 246B because the pose is held for a specific time 292. In some embodiments, the time 292 may be a maximum time or a minimum time.

Please note that a first target on the left hand is shown using reference 222A in FIG. 2A, 222B in FIG. 2B, 222C in FIG. 2C, and 222D in FIG. 2D to show the different positions of the first target. A second target on the right hand is shown using 224A in FIG. 2A, 224B in FIG. 2B, 224C in FIG. 2C, and 224D in FIG. 2D to show the different positions of the second target and a third target on the torso is shown using 226A in FIG. 2A, 226B in FIG. 2B, 226C in FIG. 2C, and 226D in FIG. 2D to show the different positions of the third target.

In some HR embodiments, the body poses may be constructed so that only two of three key positions are required to uniquely identify some poses, so creating some redundancy and thus error tolerance. In some example HR embodiments, a sequence of body poses that combine to create a message may be constructed so that reception errors may be detected and/or corrected.

Figure 3:
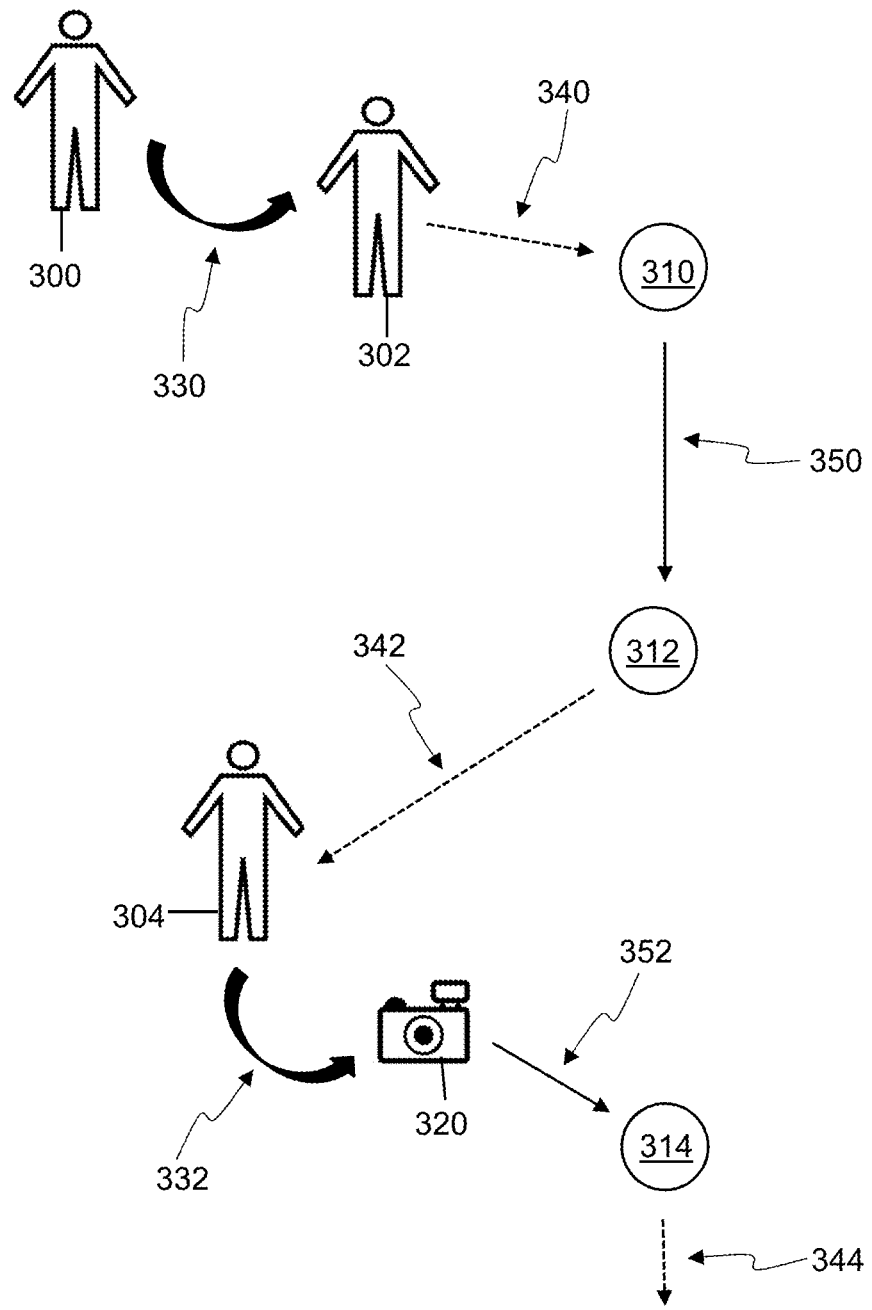
FIG. 3 shows an embodiment of an HR system used to create network connections where there are none.

FIG. 3 shows a scenario where partially connected networks are present. At the start of the vignette of FIG. 3, there are two partially connected networks: the first network comprising wireless connections 340, 342 and wired connection 350; and the second network comprising wireless connection 344 and wired connection 352. The connected devices in the first network include the HR system worn by a first team member 302, the HR system worn by a second team member 304, a first network device 310, and a second network device 312. The connected devices in the second network include a camera 320 and third network device 314; note that the third network device 314 may provide a connection to the external network via wireless link 344. At the start of the vignette of FIG. 3, the HR system worn by team member 300 is not connected to either the first or the second network, and, the first network and second network are not connected.

To relay a message from the HR system worn by a third team member 300 to the outside world, two gaps in the network must be bridged. First a message 330 associated with a body pose signal from the third team member 300 to the HR system worn by the first team member 302 who is proximal may be relayed. The message may then be routed through the first network to the HR system worn by the second team member 304, for example instructing the second team member 304 to repeat a pose. The pose made by the second team member 304 may create an associated message 332 relayed to proximal camera 320. Finally, the message is routed to the external world via the second network.

Figure 4:
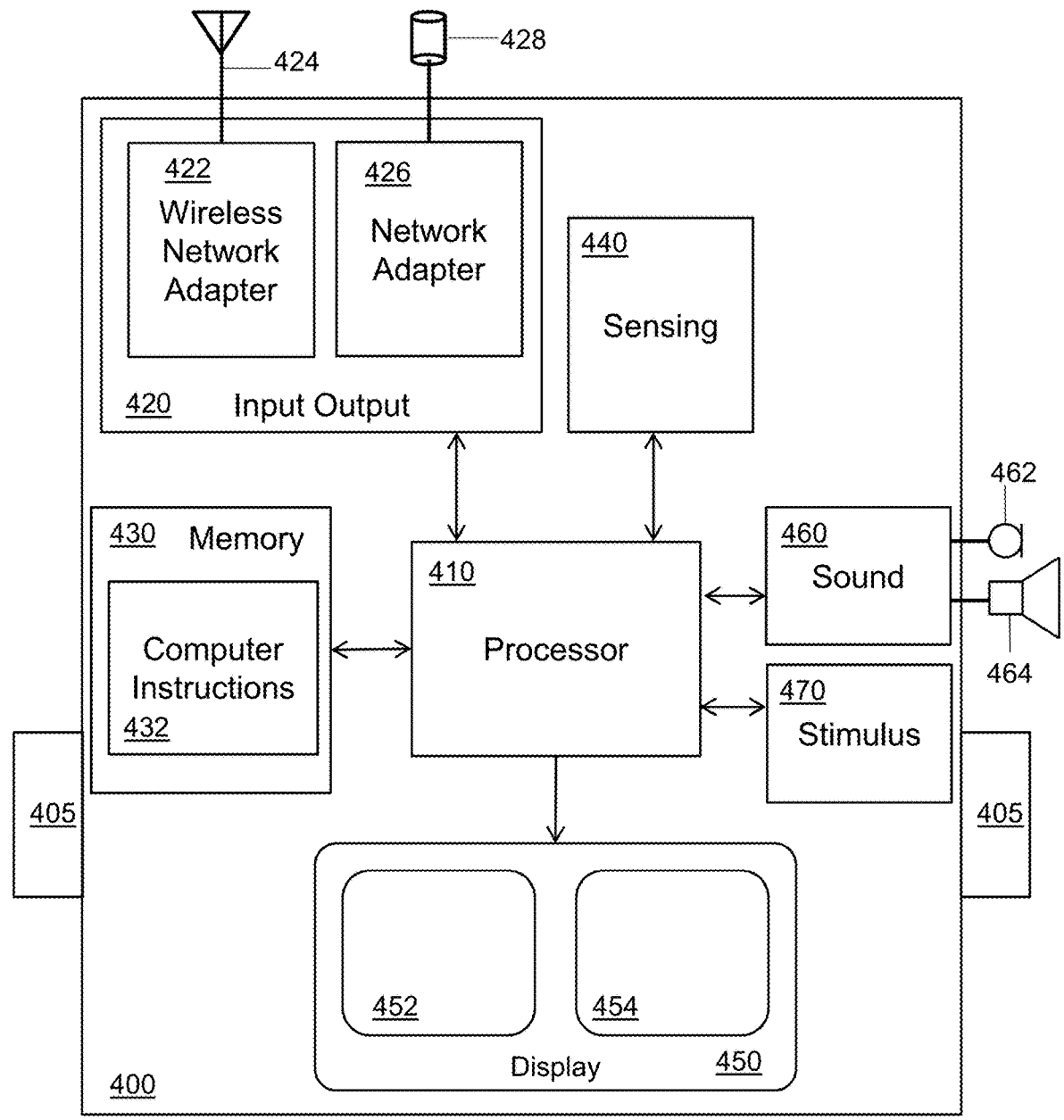
FIG. 4 shows a block diagram of an embodiment of an HR system.

FIG. 4 is a block diagram of an embodiment of an HR system 400 which may have some components implemented as part of a head-mounted assembly. The HR system 400 may be considered a computer system that can be adapted to be worn on the head, carried by hand, or otherwise attached to a user. In the embodiment of the HR system 400 shown, a structure 405 is included which is adapted to be worn on the head of a user. The structure 405 may include straps, a helmet, a hat, or any other type of mechanism to hold the HR system on the head of the user as an HMD.

The HR system 400 also includes a display 450 coupled to position the display 450 in a field-of-view (FOV) of the user. The structure 405 may position the display 450 in a field of view of the user. In some embodiments, the display 450 may be a stereoscopic display with two separate views of the FOV, such as view 452 for the user's left eye, and view 454 for the user's right eye. The two views 452, 454 may be shown as two images on a single display device or may be shown using separate display devices that are included in the display 450. In some embodiments, the display 450 may be transparent, such as in an augmented reality (AR) HMD. In systems where the display 450 is transparent, the view of the FOV of the real-world as seen through the display 450 by the user is composited with virtual objects that are shown on the display 450. The virtual objects may occlude real objects in the FOV as overlay elements and may themselves be transparent or opaque, depending on the technology used for the display 450 and the rendering of the virtual object. A virtual object, such as an overlay element, may be positioned in a virtual space, which could be two-dimensional or three-dimensional, depending on the embodiment, to be in the same position as an associated real object in real space. Note that if the display 450 is a stereoscopic display, two different views of the overlay element may be rendered and shown in two different relative positions on the two views 452, 454, depending on the disparity as defined by the inter-ocular distance of a viewer.

In some embodiments, the HR system 400 includes one or more sensors in a sensing block 440 to sense at least a portion of the FOV of the user by gathering the appropriate information for that sensor, for example visible light from a visible light camera, from the FOV of the user. Any number of any type of sensor, including sensors described previously herein, may be included in the sensor block 440, depending on the embodiment.

The HR system 400 may also include an I/O block 420 to allow communication with external devices. The I/O block 420 may include one or both of a wireless network adapter 422 coupled to an antenna 424 and a network adapter 426 coupled to a wired connection 428. The wired connection 428 may be plugged into a portable device, for example a mobile phone, or may be a component of an umbilical system such as used in extreme environments.

In some embodiments, the HR system 400 includes a sound processor 460 which takes input from one or more microphones 462. In some HR systems 400, the microphones 462 may be attached to the user. External microphones, for example attached to an autonomous drone, may send sound data samples through wireless or wired connections to I/O block 420 instead of, or in addition to, the sound data received from the microphones 462. The sound processor 460 may generate sound data which is transferred to one or more speakers 464, which are a type of sound reproduction device. The generated sound data may be analog samples or digital values. If more than one speaker 464 is used, the sound processor may generate or simulate 2D or 3D sound placement. In some HR systems 400, a first speaker may be positioned to provide sound to the left ear of the user and a second speaker may be positioned to provide sound to the right ear of the user. Together, the first speaker and the second speaker may provide binaural sound to the user.

In some embodiments, the HR system 400 includes a stimulus block 470. The stimulus block 470 is used to provide other stimuli to expand the HR system user experience. Embodiments may include numerous haptic pads attached to the user that provide a touch stimulus. Embodiments may also include other stimuli, such as, but not limited to, changing the temperature of a glove, changing the moisture level or breathability of a suit, or adding smells to a breathing system.

The HR system 400 may include a processor 410 and one or more memory devices 430, which may also be referred to as a tangible medium or a computer readable medium. The processor 410 is coupled to the display 450, the sensing block 440, the memory 430, I/O block 420, sound block 460, and stimulus block 470, and is configured to execute the instructions 432 encoded on (i.e. stored in) the memory 430. Thus, the HR system 400 may include an article of manufacture comprising a tangible medium 430, that is not a transitory propagating signal, encoding computer-readable instructions 432 that, when applied to a computer system 400, instruct the computer system 400 to perform one or more methods described herein, thereby configuring the processor 400.

While the processor 410 included in the HR system 400 may be able to perform methods described herein autonomously, in some embodiments, processing facilities outside of that provided by the processor 410 included inside of the HR system 400 may be used to perform one or more elements of methods described herein. In one non-limiting example, the processor 410 may receive information from one or more of the sensors 440 and send that information through the wireless network adapter 422 to an external processor, such as a cloud processing system or an external server. The external processor may then process the sensor information to identify a pose by another individual and then send information about the pose to the processor 410 through the wireless network adapter 422. The processor 410 may then use that information to initiate an action, an alarm, a notification of the user, or provide any other response to that information.

In some embodiments, the instructions 432 may instruct the HR system 400 to interpret a body-pose message. The instructions 432 may instruct the HR system 400 to receive sensor data either transmitted through the wireless network adapter 422 or received from the sensing block 440 from, for example a camera. The instructions 432 may instruct the HR system 400 to detect a first body in the sensor data and determine one or more a body parts, for example hands or arms, using object recognition. The instructions 432 may further instruct the HR system 400 to compute a first point associated with the body part at a first time, and sometime later, receive updated sensor data and compute a second point associated with the body part. The instructions 432 may instruct the HR system 400 to use the first and second points to associate an apparent body pose which may be looked up in a table to generate a message. The instructions 432 may instruct the HR system 400 to transmit the message, for example presenting an alert on the display 450.

In some embodiments, the instructions 432 may instruct the HR system 400 to interpret a body-pose message. The instructions 432 may instruct the HR system 300 to receive sensor data either transmitted through the wireless network adapter 422 or received from the sensing block 440 from, for example an infra-red camera. The instructions 432 may instruct the HR system 400 to detect a first shape in the sensor data, for example a cross using object detection. The instructions 432 may further instruct the HR system 400 to compute a first point associated with the shape at a first time, and sometime later, receive updated sensor data and compute a second point associated with the new shape position. The instructions 432 may instruct the HR system 400 to use the first and second points to associate an apparent body pose which may be looked up in a table to generate a message. The instructions 432 may instruct the HR system 400 to transmit the message, for example presenting text on the display 450.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
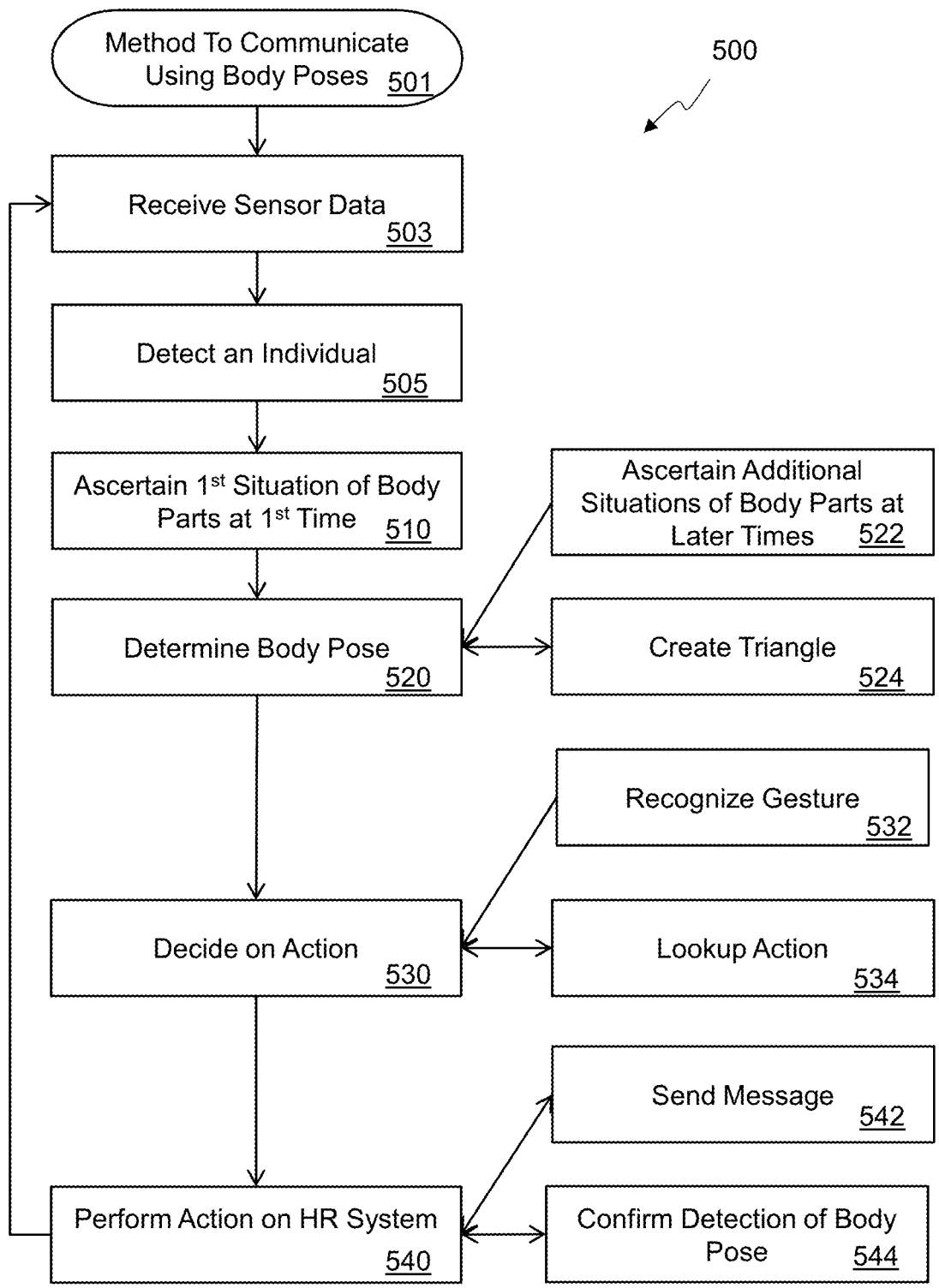
FIG. 5 is a flowchart of an embodiment of a method for communicating using body poses.

FIG. 5 is a flowchart 500 of an embodiment of a method for communicating using body poses. This may include communication without using an electronic network link. One or more parts of this method is performed by an HR system which may include a head-mounted display (HMD) worn by a user. The method includes receiving data from a sensor 503. The sensor may be a still camera or a video camera sensitive to visible light, infrared light, or any other spectrum of light. The sensor may be an ultrasound sensor, a sonar sensor, or a radar sensor. Any type of sensor may be used, depending on the embodiment.

An individual is detected in the sensor data 505. The individual is not the same person as the user of the HR system. Depending on the embodiment, the sensor may be remote from the user and the HR system, such as sensors fixedly mounted in the environment or a sensor mounted on a drone which may be controlled by the user of the HR system, the individual detected by the sensor, or by a third party. In some embodiments, the individual detected by the sensor may be outside of a field of view of the user and the HR system. In some embodiments, the sensor is conveyed by the user of the HR system and the individual may be within a field of view of the HR system user. The sensor may be integrated into the HR system, worn as a separate device by the user, or carried by the user. In some embodiments, the sensor has a 360° field of view.

A first situation of at least one body part of the individual in 3D space is ascertained 510 at a first time. In some embodiments, the ascertaining of the first situation of the at least one body part is performed by a computer remote from the HR system, but in other embodiments, the ascertaining is performed by a processor in the HR system. In embodiments, the at least one body part may include one, two, three, or more body parts. The body parts may be any part of the individual's body, including, but not limited to, a head, an arm, a hand, a torso, a leg, or a foot. In some embodiments, the at least one body part includes a first hand and at least one of a second hand, a head, or a torso.

The method continues by determining a body pose 520 based on the first situation of the at least one body part. The situation of the at least one body part may include a position and/or orientation of one or more of the individual body parts included in the at least one body part. As one non-limiting example, a triangle may be created 524 with a first vertex based on a first position of a first body part, a second vertex based on a second position of a second body part, and a third vertex based on a third position of the third body part. The body pose may then be determined based on characteristics of the triangle. In other embodiments, the body pose may be determined by an angle of the individual's elbow if their upper arm is near horizontal, or a distance between the individual's feet while they have both hands raised above their head. In some embodiments, traditional hand signals, such as touching the top of one's head with the fingers pointed down to signify "OK" or waving both arms up and down to signify "I need help!", may be recognized (i.e. determined).

In some embodiments, additional situations of the at least one body parts may be ascertained 522 at later times which may then be used with the first situation to determine the body pose. For example, the method may include ascertaining a second situation of the at least one body part in 3D space at a second time and determining the body pose based on both the first situation of the at least one body part and the second situation of the at least one body part. In some embodiments the body pose may be determined based on a motion between the first situation of the at least one body part and the second situation of the at least one body part. In another example embodiment, the body pose may be determined, at least in part, by calculating a velocity (distance divided by time) of a body part based on two situations of the body part. The velocity may be used in combination with a position at the start or end of a movement to determine the body pose. In some embodiments, a body pose is only determined after it is held for a predetermined interval, such as one second, two seconds, five seconds, ten seconds or some other interval, depending on the embodiment. Thus, the determination of the body pose may include computing a first difference between the first situation of the at least one body part at a first time and the second situation of the at least one body part at a second time, with the body pose determined in response to the first difference being less than a threshold. In such embodiments the first time and the second time are separated by a predetermined interval, which may be at least 1 second long in some embodiments, and the threshold is an amount of movement that is allowed for movement by the individual during the time that they are holding the body pose.

Some embodiments may include recognizing a gesture 532. This may be accomplished by ascertaining a second situation of the at least one body part in 3D space at a second time and ascertaining a third situation of the at least one body part in 3D space at a third time. The gesture may then be recognized based on the body pose ascertained from the first situation of the at least one body part at a first time, the second situation of the at least one body part and the third situation of the at least one body part.

The method also includes deciding on an action 530 based on the body pose. In embodiments where a gesture is recognized, the action may be based on the gesture. In some embodiments, the action may be decided on based on a sequence two or more body poses. The body pose may be looked up 534 in a table of pre-determined body poses and/or body pose motions to determine the action in some embodiments.

Deciding on the action may include determining a message to deliver to the user. In at least one embodiment, the message may be provided as data during table lookup 534. The table may be a pre-loaded local database, whose contents may be specific to a mission, a particular circumstance, a particular location, a type of individual (e.g. a trained solder, a civilian, a first responder, or the like), or a specific individual. In some embodiments, the type of individual may also be determined using sensor data, such as by recognizing a uniform or some characteristic of the individual. The message may be an alert, a command, or an alarm. In some embodiments, the message may include a command to the user to replicate the body pose. This may be done to relay the message from the individual to another entity through the user using the HR system. This may be accomplished, for example, by presenting a virtual image of the relay body pose to the user on a display of the HR system.

The method included performing the action 540 on an HR system used by a user different than the individual. This may include sending 542 a message to a computer remote from the HR system, for example through a wireless or wired network connection. In many embodiments, a message may be sent 542 to the user of the HR system as text on a display of the HR system, an icon on the display, an animated sequence on the display, video images on the display, a still image on the display, audible speech, sound, a haptic indication, a smell, or by any other way of communicating to the user. In at least one embodiment a virtual image may be displayed associated with the at least one body part on the display of the HR system. Non-limiting examples of this include a stopwatch as shown in FIG. 1D, an icon showing the type of individual, or an indicator of the urgency of the message.

In some embodiments, the action may include sending a confirmation 544 to the individual that the body pose was determined. The confirmation may be sent in a way to be understandable by the individual using the individual's unaided natural senses as the individual may not have an electronic device, binoculars, or another device to aid them in receiving the confirmation. The confirmation may be sent to the individual by use of a bright green light, a loud sound, or a body pose performed by the user of the HR system in response to a prompt. Thus, sending the confirmation may include presenting a prompt to the user to perform a response body pose.

Figure 6:
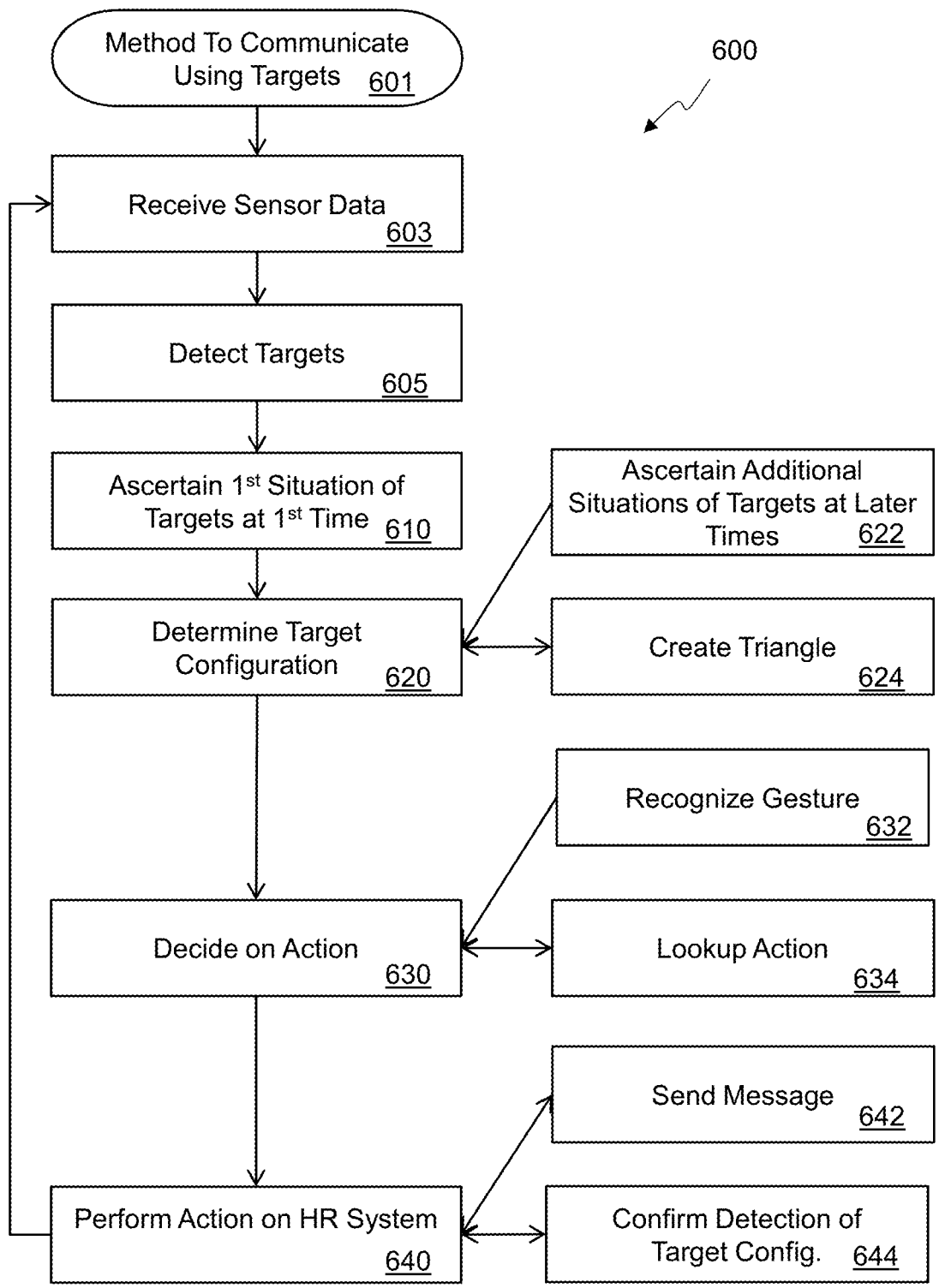
FIG. 6 is a flowchart of an embodiment of a method for communicating using targets.

FIG. 6 is a flowchart 600 of an embodiment of a method for communicating using targets. This may include communication without using an electronic network link. One or more parts of this method is performed by an HR system which may include a head-mounted display (HMD) worn by a user. The method includes receiving data from a sensor 603. The sensor may be a still camera or a video camera sensitive to visible light, infrared light, or any other spectrum of light. The sensor may be a time-of-flight camera or some other type of depth-sensing camera or sensor. The sensor may be an ultrasound sensor, a sonar sensor, or a radar sensor. Any type of sensor may be used, depending on the embodiment.

At least one target is detected in the sensor data 605. A situation of the at least one target is controlled by an individual is not the same person as the user of the HR system. Depending on the embodiment, the sensor may be remote from the user and the HR system, such as sensors fixedly mounted in the environment or a sensor mounted on a drone which may be controlled by the user of the HR system, the individual, or by a third party. In some embodiments, the at least one target detected by the sensor may be outside of a field of view of the HR system. In some embodiments, the sensor is conveyed by the user of the HR system and the at least one target may be within a field of view of the HR system user. The sensor may be integrated into the HR system, worn as a separate device by the user, or carried by the user. In some embodiments, the sensor has a 360° field of view.

A target may be any recognizable marking, device, or object. The target may have a shape that is recognizable, a specific color pattern that is recognizable, or other recognizable properties such as reflectivity of a particular spectrum of electromagnetic radiation, such as infrared light. Multiple characteristics may be used together to recognize a target, such as a specific shape with particular color or color pattern. A target may be a passive device detected by impinging electromagnetic signals, or it may be an active device that emits electromagnetic radiation such as radio-frequency messages or light. In some embodiments, one or more targets may be printed on or woven into an article or articles of clothing worn by the individual, such as a jacket or a hat. A target can also be a stand-alone object that is affixed to the user by using straps, pins, clips, adhesive, or any other mechanism.

A first situation of at least one target in 3D space is ascertained 610 at a first time. In some embodiments, the ascertaining of the first situation of the at least one target is performed by a computer remote from the HR system, but in other embodiments, the ascertaining is performed by a processor in the HR system. In embodiments, the at least one target may include one, two, three, or more targets. In at least one embodiment, each target of the at least one target is positioned on a respective body part of the individual. In some embodiments a first target of the at least one target is positioned on a body part of the individual, such as a head, an arm, a hand, a torso, a leg, or a foot, and a second target of the at least one target is positioned on an object separate from the individual. In at least one embodiment, the at least one target includes a first target positioned on a first hand of the individual and a second target positioned on a second hand of the individual, a head of the individual, or a torso of the individual.

The method continues by determining a target configuration 620 based on the first situation of the at least one target. The situation of the at least one target may include a position and/or orientation of one or more of the individual targets included in the at least one target. As one non-limiting example, a triangle may be created 624 with a first vertex based on a first position of a first target, a second vertex based on a second position of a second target, and a third vertex based on a third position of the third target. The target configuration may then be determined based on characteristics of the triangle.

In some embodiments, additional situations of the at least one target may be ascertained 622 at later times which may then be used with the first situation to determine the target configuration. For example, the method may include ascertaining a second situation of the at least one target in 3D space at a second time and determining the target configuration based on both the first situation of the at least one target and the second situation of the at least one target. In some embodiments the target configuration may be determined based on a motion between the first situation of the at least one target and the second situation of the at least one target. In another example embodiment, the target configuration may be determined, at least in part, by calculating a velocity (distance divided by time) of a target based on two situations of the target. The velocity may be used in combination with a position at the start or end of a movement to determine the target configuration. In some embodiments, a target configuration is only determined after it is held for a predetermined interval, such as one second, two seconds, five seconds, ten seconds or some other interval, depending on the embodiment. Thus, the determination of the target configuration may include computing a first difference between the first situation of the at least one target at a first time and the second situation of the at least one target at a second time, with the target configuration determined in response to the first difference being less than a threshold. In such embodiments the first time and the second time are separated by a predetermined interval, which may be at least 1 second long in some embodiments, and the threshold is an amount of movement that is allowed for movement of the target during the time that they are holding the target configuration, as the individual may not be able to hold perfectly still.

Some embodiments may include recognizing a gesture 632. This may be accomplished by ascertaining a second situation of the at least one target in 3D space at a second time and ascertaining a third situation of the at least one target in 3D space at a third time. The gesture may then be recognized based on the target configuration ascertained from the first situation of the at least one target at a first time, the second situation of the at least one target and the third situation of the at least one target.

The method also includes deciding on an action 630 based on the target configuration. In embodiment where a gesture is recognized, the action may be based on the gesture. In some embodiments, the action may be decided on based on a sequence two or more target configurations. The target configuration may be looked up 634 in a table of pre-determined target configurations and/or target motions to determine the action in some embodiments.

Deciding on the action may include determining a message to deliver to the user. In at least one embodiment, the message may be provided as data during table lookup 534. The table may be a pre-loaded local database whose contents may be specific to a mission, a particular circumstance, a particular location, a type of individual (e.g. a trained solder, a civilian, a first responder, or the like) controlling the at least one target, or a specific individual controlling the at least one target. In some embodiments, the type of individual may also be determined using sensor data, such as by recognizing a uniform or some characteristic of the individual. The message may be an alert, a command, or an alarm. In some embodiments, the message may include a command to the user to perform a body pose consistent with the target configuration. This may be done to relay the message from the individual to another entity through the user of the HR system. This may be accomplished by presenting a virtual image of the body pose consistent with the target configuration to the user on a display of the HR system.

The method includes performing the action 640 on an HR system used by a user different than the individual. This may include sending 642 a message to a computer remote from the HR system, for example through a wireless or wired network connection. In many embodiments, a message may sent 642 to the user of the HR system as text on a display of the HR system, an icon on the display, an animated sequence on the display, video images on the display, a still image on the display, audible speech, sound, a haptic indication, a smell, or by any other way of communicating to the user. In at least one embodiment a virtual image may be displayed associated with the at least one target on the display. Non-limiting examples of this include a stopwatch as shown in FIG. 2D, an icon showing the type of individual, or an indicator of the urgency of the message.

In some embodiments, the action may include sending a confirmation 644 to the individual controlling the at least one target that the target configuration was determined. The confirmation may be sent in a way to be understandable by the individual using the individual's unaided natural senses as the individual may not have an electronic device, binoculars, or another device to aid them in receiving the confirmation. The confirmation may be sent to the individual by use of a bright green light, a loud sound, or a body pose performed by the user of the HR system in response to a prompt. Thus, sending the confirmation may include presenting a prompt to the user to perform a response body pose.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system," or other terms. Furthermore, aspects of the various embodiments may take the form of a computer program product embodied in one or more computer-readable medium(s) having computer program code stored thereon.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or micro-code. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server, such as a cloud-based server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, $\pi$, $3.\overline{33}$, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

Various embodiments are included following:

Embodiment 1. A method comprising: receiving data from a sensor; detecting an individual in the sensor data; ascertaining a first situation of at least one body part of the individual in 3D space at a first time; determining a body pose based on the first situation of the at least one body part; deciding on an action based on the body pose; and performing the action on a hybrid reality (HR) system used by a user different than the individual.

Embodiment 2. The method of embodiment 33, the HR system comprising a head-mounted display.

Embodiment 3. The method of embodiment 1, wherein said ascertaining the first situation of the at least one body part is performed by a computer remote from the HR system.

Embodiment 4. The method of embodiment 1, the at least one body part comprising a head, an arm, a hand, a torso, a leg, or a foot.

Embodiment 5. The method of embodiment 1, the at least one body part comprising a first hand and at least one of a second hand, a head, or a torso.

Embodiment 6. The method of embodiment 1, the at least one body part comprising a first body part, a second body part, and a third body part; the method further comprising: creating a triangle with a first vertex based on a first position of the first body part, a second vertex based on a second position of the second body part, and a third vertex based on a third position of the third body part; and determining the body pose based on characteristics of the triangle.

Embodiment 7. The method of embodiment 1, the action comprising sending a confirmation to the individual that the body pose was determined.

Embodiment 8. The method of embodiment 7, the confirmation sent in a way to be understandable by the individual using the individual's unaided natural senses.

Embodiment 9. The method of embodiment 7, said sending the confirmation comprising presenting a prompt to the user to perform a response body pose.

Embodiment 10. The method of embodiment 1, said deciding on the action comprising selecting a particular action from a set of predetermined actions based on the body pose.

Embodiment 11. The method of embodiment 1, said deciding on the action comprising determining a message to deliver to the user based on the body pose.

Embodiment 12. The method of embodiment 11, wherein the message is an alert, a command, or an alarm.

Embodiment 13. The method of embodiment 11, wherein the message is delivered to the user as text on a display of the HR system, an icon on the display, an animated sequence on the display, video images on the display, a still image on a display of the HR system, audible speech, sound, a haptic indication, or a smell.

Embodiment 14. The method of embodiment 11, the message comprising a command to the user to replicate the body pose.

Embodiment 15. The method of embodiment 14, further comprising presenting a virtual image of the body pose to the user on a display of the HR system.

Embodiment 16. The method of embodiment 1, wherein the sensor is remote from the user and the HR system.

Embodiment 17. The method of embodiment 16, wherein the sensor is mounted on a drone controlled by the user.

Embodiment 18. The method of embodiment 16, wherein the individual is outside of a field of view of the HR system.

Embodiment 19. The method of embodiment 1, the action comprising displaying a virtual image associated with the at least one body part on the display of the HR system.

Embodiment 20. The method of embodiment 1, wherein the sensor is conveyed by the user.

Embodiment 21. The method of embodiment 20, wherein the sensor is integrated into the HR system.

Embodiment 22. The method of embodiment 20, wherein the sensor has a 360° field of view.

Embodiment 23. The method of embodiment 20, wherein the individual is within a field of view of the user.

Embodiment 24. The method of embodiment 1, the action comprising sending a message to a computer remote from the HR system, wherein the message is based on the body pose.

Embodiment 25. The method of embodiment 1, further comprising: ascertaining a second situation of the at least one body part in 3D space at a second time; determining the body pose based on both the first situation of the at least one body part and the second situation of the at least one body part.

Embodiment 26. The method of embodiment 25, further comprising determining the body pose based on a motion between the first situation of the at least one body part and the second situation of the at least one body part.

Embodiment 27. The method of embodiment 25, further comprising: computing a first difference between the first situation of the at least one body part and the second situation of the at least one body part; and determining the body pose in response to the first difference being less than a threshold; wherein the first time and the second time are separated by a predetermined interval.

Embodiment 28. The method of embodiment 27, the predetermined interval being at least 1 second long.

Embodiment 29. The method of embodiment 1, further comprising: ascertaining a second situation of the at least one body part in 3D space at a second time; ascertaining a third situation of the at least one body part in 3D space at a third time; recognizing a gesture based on the body pose, the second situation of the at least one body part and the third situation of the at least one body part; and deciding on the action based on the gesture.

Embodiment 30. The method of embodiment 1, further comprising: ascertaining a second situation of the at least one body part in 3D space at a second time; determining a different body pose based on the second situation of the at least one body part; and deciding on the action based on a sequence of the body pose followed by the different body pose.

Embodiment 31. An article of manufacture comprising a tangible medium, that is not a transitory propagating signal, encoding computer-readable instructions that, when applied to a computer system, instruct the computer system to perform a method comprising: receiving data from a sensor; detecting an individual in the sensor data; ascertaining a first situation of at least one body part of the individual in 3D space at a first time; determining a body pose based on the first situation of the at least one body part; deciding on an action based on the body pose; and performing the action on a hybrid reality (HR) system worn by a user different than the individual.

Embodiment 32. A head-mounted display (HMD) comprising: a display; a structure, coupled to the display and adapted to position the display in a field-of-view (FOV) of the user; and a processor, coupled to the display and the sound reproduction device, the processor configured to: receive data from a sensor; detect an individual not wearing the HMD in the sensor data; ascertain a first situation of at least one body part of the individual in 3D space at a first time; determine a body pose based on the first situation of the at least one body part; decide on an action based on the body pose; and perform the action.

Embodiment 33. A method comprising: receiving data from a sensor; detecting at least one target in the sensor data, a situation of the at least one target controlled by an individual; ascertaining a first situation of the at least one target in 3D space at a first time; determining a target configuration based on the first situation of the at least one target; deciding on an action based on the target configuration; and performing the action on a hybrid reality (HR) system used by a user different than the individual.

Embodiment 34. The method of embodiment 33, the HR system comprising a head-mounted display.

Embodiment 35. The method of embodiment 33, wherein said ascertaining the first situation of the at least one target is performed by a computer remote from the HR system.

Embodiment 36. The method of embodiment 33, wherein each target of the at least one target is positioned on the individual.

Embodiment 37. The method of embodiment 33, wherein a first target of the at least one target is positioned on a body part of the individual.

Embodiment 38. The method of embodiment 37, the body part being a head, an arm, a hand, a torso, a leg, or a foot.

Embodiment 39. The method of embodiment 33, wherein a second target of the at least one target is positioned on an object separate from the individual.

Embodiment 40. The method of embodiment 33, the at least one target comprising a first target positioned on a first hand of the individual and a second target positioned on a second hand of the individual, a head of the individual, or a torso of the individual.

Embodiment 41. The method of embodiment 33, the at least one target comprising a first target, a second target, and a third target; the method further comprising: creating a triangle with a first vertex based on a first position of the first target, a second vertex based on a second position of the second target, and a third vertex of the third target; and determining the target configuration based on characteristics of the triangle.

Embodiment 42. The method of embodiment 33, the action comprising sending a confirmation to the individual that the target configuration was determined.

Embodiment 43. The method of embodiment 42, the confirmation sent in a way to be understandable by the individual using the individual's unaided natural senses.

Embodiment 44. The method of embodiment 42, said sending the confirmation comprising presenting a prompt to the user to perform a response body pose.

Embodiment 45. The method of embodiment 33, said deciding on the action comprising selecting a particular action from a set of predetermined actions based on the target configuration.

Embodiment 46. The method of embodiment 33, said deciding on the action comprising determining a message to deliver to the user based on the target configuration.

Embodiment 47. The method of embodiment 46, wherein the message is one of an alert, a command, or an alarm.

Embodiment 48. The method of embodiment 46, wherein the message is delivered to the user as text on a display of the HR system, an icon on the display, an animated sequence on the display, video images on the display, a still image on the display, audible speech, sound, a haptic indication, or a smell.

Embodiment 49. The method of embodiment 46, the message comprising a command to the user to perform a body pose consistent with the target configuration.

Embodiment 50. The method of embodiment 49, further comprising presenting a virtual image of the body pose to the user on a display of the HR system.

Embodiment 51. The method of embodiment 33, wherein the sensor is remote from the user and the HR system.

Embodiment 52. The method of embodiment 51, wherein the sensor is mounted on a drone controlled by the user.

Embodiment 53. The method of embodiment 51, wherein the at least one target is outside of a field of view of the HR system.

Embodiment 54. The method of embodiment 33, the action comprising displaying a virtual image associated with the at least one target on a display of the HR system.

Embodiment 55. The method of embodiment 33, wherein the sensor is conveyed by the user.

Embodiment 56. The method of embodiment 55, wherein the sensor is integrated into the HR system.

Embodiment 57. The method of embodiment 55, wherein the sensor has a 360° field of view.

Embodiment 58. The method of embodiment 55, wherein the at least one target is within a field of view of the user.

Embodiment 59. The method of embodiment 33, the action comprising sending a message to a computer remote from the HR system, wherein the message is based on the target configuration.

Embodiment 60. The method of embodiment 33, further comprising: ascertaining a second situation of the at least one target in 3D space at a second time; determining the target configuration based on both the first situation of the at least one target and the second situation of the at least one target.

Embodiment 61. The method of embodiment 60, further comprising determining the target configuration based on a motion between the first situation of the at least one target and the second situation of the at least one target.

Embodiment 62. The method of embodiment 60, further comprising: computing a first difference between the first situation of the at least one target and the second situation of the at least one target; and determining the target configuration in response to the first difference being less than a threshold; wherein the first time and the second time are separated by a predetermined interval.

Embodiment 63. The method of embodiment 62, the predetermined interval being at least 1 second long.

Embodiment 64. The method of embodiment 33, further comprising: ascertaining a second situation of the at least one target in 3D space at a second time; ascertaining a third situation of the at least one target in 3D space at a third time; recognizing a gesture based on the target configuration, the second situation of the at least one target and the third situation of the at least one target; and deciding on the action based on the gesture.

Embodiment 65. The method of embodiment 33, further comprising: ascertaining a second situation of the at least one target in 3D space at a second time; determining a different target configuration based on the second situation of the at least one target; and deciding on the action based on a sequence of the target configuration followed by the different target configuration.

Embodiment 66. An article of manufacture comprising a tangible medium, that is not a transitory propagating signal, encoding computer-readable instructions that, when applied to a computer system, instruct the computer system to perform a method comprising: receiving data from a sensor; detecting at least one target in the sensor data, a situation of the at least one target controlled by an individual; ascertaining a first situation of the at least one target in 3D space at a first time; determining a target configuration based on the first situation of the at least one target; deciding on an action based on the target configuration; and performing the action on a hybrid reality (HR) system worn by a user different than the individual.

Embodiment 67. A head-mounted display (HMD) comprising: a display; a structure, coupled to the display and adapted to position the display in a field-of-view (FOV) of the user; and a processor, coupled to the display and the sound reproduction device, the processor configured to: receive data from a sensor; detect at least one target in the sensor data, a situation of the at least one target controlled by an individual not wearing the HMD; ascertain a first situation of at least one target of the individual in 3D space at a first time; determine a target configuration based on the first situation of the at least one target; decide on an action based on the target configuration; and perform the action.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A method comprising:
capturing a first image using a sensor of a hybrid reality (HR) system worn or carried by a user;
detecting, by a computing device, an individual, different than the user, in the first image;
ascertaining, by the computing device, a first situation of at least one body part of the individual in 3D space at a first time using the first image;
recognizing, by the computing device, a body pose of the individual based on the first situation of the at least one body part of the individual;
determining, by the computing device, information for the user to relay to the individual based on the recognized body pose of the individual;
selecting a response body pose that corresponds to the information to relay to the individual; and
prompting the user using the HR system to perform the response body pose to relay the information to the individual.

2. The method of claim 1, the HR system comprising a head-mounted display and the computing device.

3. The method of claim 1, wherein the computing device comprises a local processor in the HR system, a remote processor located remotely from the HR system, and a communication interface communicatively coupling the local processor to the remote processor; and
wherein at least one of said detecting the individual in the first image, said ascertaining the first situation of the at least one body part of the individual, said recognizing a body pose of the individual, said determining information for the user to relay to the individual, or said selecting the response body pose for the user, is performed by the remote processor.

4. The method of claim 1, further comprising selecting, by the computing device, a particular action to be performed by the HR system, in addition to said prompting, from a set of predetermined actions based on the recognized body pose of the individual.

5. The method of claim 1, said prompting the user to perform the response body pose comprising presenting a virtual image of the response body pose to the user on a display of the HR system.

6. The method of claim 1, further comprising:
sending a message to a computer remote from the HR system, wherein the message is based on the recognized body pose of the individual; and
receiving a message from the computer remote from the HR system, wherein the message provides the information or the response body pose.

7. The method of claim 1, further comprising:
capturing a sequence of images of the at least one body part of the individual, including the first image, using the sensor that show the individual making a gesture;
recognizing the gesture, by the computing device, made by the individual using in the sequence of images of the at least one body part of the individual; and
selecting, by the computing device, a particular action to be performed by the HR system, in addition to said prompting, from a set of predetermined actions based on the gesture as the body pose of the individual.

8. The method of claim 1, said determining further comprising:
accessing data stored in a memory of the computing device to select the response body pose, the data providing a correspondence between a plurality of messages and a plurality of response body poses, wherein the information includes a message of the plurality of messages.

9. The method of claim 1, further comprising:
distinguishing, by the computing device using the first image, a characteristic of the individual separate from the first situation of the at least one body part of the individual; and
using the characteristic of the individual to determine the information to relay to the information or select the response body pose.

10. The method of claim 9, wherein the characteristic of the individual comprises a uniform worn by the individual.

11. An article of manufacture comprising a tangible medium, that is not a transitory propagating signal, encoding computer-readable instructions that, when applied to a computer system, instruct the computer system to perform a method comprising:
capturing a first image using a sensor of a hybrid reality (HR) system worn or carried by a user;
detecting an individual, different than the user, in the first image;
ascertaining a first situation of at least one body part of the individual in 3D space at a first time using the first image;
recognizing a body pose of the individual based on the first situation of the at least one body part of the individual;
determining information for the user to relay to the individual based on the recognized body pose of the individual;
selecting a response body pose that corresponds to the information to relay to the individual; and
prompting the user using the HR system to perform the response body pose to relay the information to the individual.

12. The article of manufacture of claim 11, said prompting the user to perform the response body pose comprising presenting a virtual image of the response body pose to the user on a display of the HR system.

13. The article of manufacture of claim 11, the method further comprising:
sending a message to a computer remote from the HR system, wherein the message is based on the recognized body pose of the individual; and
receiving a message from the computer remote from the HR system, wherein the message provides the information or the response body pose.

14. The article of manufacture of claim 11, the method further comprising:
accessing data stored in a memory of the computing device to select the response body pose, the data providing a correspondence between a plurality of messages and a plurality of response body poses, wherein the information includes a message of the plurality of messages.

15. The article of manufacture of claim 11, the method further comprising:
distinguishing, by the computing device using the first image, a characteristic of the individual separate from the first situation of the at least one body part of the individual; and using the characteristic of the individual to determine the information to relay to the information or select the response body pose.

16. A head-mounted display (HMD) comprising:
a display;
a structure, coupled to the display and adapted to position the display in a field-of-view (FOV) of a user;
a sensor; and
a processor, coupled to the display and the image sensor, the processor configured to:
receive first image data from the sensor;
detect an individual not wearing the HMD in the first image data;
ascertain a first situation of at least one body part of the individual in 3D space at a first time using the first image data;
recognize a body pose of the individual based on the first situation of the at least one body part of the individual;
determine information for the user to relay to the individual based on the recognized body pose of the individual;
select a response body pose that corresponds to the information to relay to the individual; and
prompt the user to perform the response body pose to relay the information to the individual.

17. The system of claim 16, the processor further configured to present a virtual image of the response body pose to the user on the display as at least a part of said prompt.

18. The system of claim 16, the processor further configured to:
send a message to a computer remote from the HMD, wherein the message is based on the recognized body pose of the individual; and
receive a message from the computer remote from the HMD, wherein the message provides the information or the response body pose.

19. The system of claim 16, the processor further configured to:
access data stored in a memory of the computing device to select the response body pose, the data providing a correspondence between a plurality of messages and a plurality of response body poses, wherein the information includes a message of the plurality of messages.

20. The system of claim 16, the processor further configured to:
distinguish, using the first image, a characteristic of the individual separate from the first situation of the at least one body part of the individual; and
use the characteristic of the individual to determine the information to relay to the information or select the response body pose.

* * * * *